United States Patent [19]

Kramer

[11] Patent Number: 5,184,319
[45] Date of Patent: Feb. 2, 1993

[54] FORCE FEEDBACK AND TEXTURES SIMULATING INTERFACE DEVICE

[76] Inventor: James F. Kramer, P.O. Box 5984, Stanford, Calif. 94309

[21] Appl. No.: 474,168

[22] Filed: Feb. 2, 1990

[51] Int. Cl.$^5$ .............................................. B25J 3/00
[52] U.S. Cl. ..................................... 364/806; 414/5; 901/34; 340/706
[58] Field of Search ......................... 414/4, 5, 2, 6, 7; 340/706; 901/33, 34; 364/146, 513, 806

[56] References Cited

U.S. PATENT DOCUMENTS

| | | | |
|---|---|---|---|
| 3,923,166 | 12/1975 | Fletcher et al. | 414/4 |
| 4,046,262 | 9/1977 | Vykukal et al. | 414/5 |
| 4,302,138 | 11/1981 | Zarudiansky | 901/33 |
| 4,414,984 | 11/1983 | Zarudiansky | 414/5 |
| 4,510,574 | 4/1985 | Guittet et al. | 364/513 |
| 4,655,673 | 4/1987 | Hawkes | 414/5 |
| 4,661,032 | 4/1987 | Arai | 414/5 |
| 4,853,874 | 8/1989 | Iwamoto et al. | 414/2 |
| 4,962,448 | 10/1990 | DeMaio et al. | 364/146 |
| 4,988,981 | 1/1991 | Zimmerman et al. | 340/706 |
| 5,004,391 | 4/1991 | Burden | 414/6 |

OTHER PUBLICATIONS

Product disclosure providing a force-reflective controller, Sarcos Research, Utah (date unknown).
Hayati, "A Unified Teleoperated-Autonomous Dual-Arm Robotic System," IEEE Control Systems, vol. 11, No. 2, pp. 3-8, Feb. 1991.
Iwata, "Artificial Reality with Force-Feedback: Development of Desktop Virtual Space with Compact Master Manipulator", Computer Graphics, vol. 24, No. 4, p. 165-170 Aug. 1990.
Kilkpatrick, "The Use of a Kinesthetic Supplement in an Interactive Graphic System," Ph.D. Thesis, UNC, Dept. of Computor Science, 1976.

Primary Examiner—Jerry Smith
Assistant Examiner—Jim Trammell

[57] ABSTRACT

A man-machine interface is disclosed which provides force and texture information to sensing body parts. The interface is comprised of a force actuating device that produces a force which is transmitted to a force applying device. The force applying device applies the generated force to a pressure sensing body part. A force sensor on the force applying device measures the actual force applied to the pressure sensing body part, while angle sensors measure the angles of relevant joint body parts. A computing device uses the joint body part position information to determine a desired force value to be applied to the pressure sensing body part. The computing device combines the joint body part position information with the force sensor information to calculate the force command which is sent to the force actuating device. In this manner, the computing device may control the actual force applied to a pressure sensing body part to a desired force which depends upon the positions of related joint body parts. In addition, the interface is comprised of a displacement actuating device which produces a displacement which is transmitted to a displacement applying device (e.g., a texture simulator). The displacement applying device applies the generated displacement to a pressure sensing body part. The force applying device and displacement applying device may be combined to simultaneously provide force and displacement information to a pressure sensing body part.

24 Claims, 18 Drawing Sheets

FORCE FEEDBACK AND TEXTURES SIMULATING INTERFACE DEVICE

TECHNICAL FIELD

This invention relates to a man-machine interface and in particular to an interface that measures body part positions and provides force and texture feedback to a user.

BACKGROUND OF THE INVENTION

A new manner of computer interaction is now in its infancy. The words "virtual environment" or "virtual reality" will soon be commonplace. A virtual environment is an environment where some portion of the environment is artificially simulated, most often via a computer. A computer may create a graphic simulation of an environment, complete with graphic images of chairs, windows, doors, walls, etc., and even images of other people. The computer may also simulate environmental sounds. The generated objects may be viewed on a common two dimensional display, such as a computer screen, or, by viewing with special stereoscopic equipment, the objects may be made to appear three dimensional.

The most natural way for an individual to interact in a virtual environment is to directly control a graphical representation of himself. For example, if the individual turns his head, the display screen at which he is looking is appropriately updated. Also, if the individual reaches out and closes his hand, the computer generated image of his hand on the screen reaches out and closes. Such virtual environments have been discussed in the literature.

To create the sensation of a virtual reality, the computer should be able to generate and manipulate graphic images of real or imaginary objects in real time. Although generating a graphic representation of an environment may be time consuming and nontrivial to implement, much of the theory has been explored and is well understood by those skilled in the art of interactive 3-D computer graphics and solid modeling. The invention described here pertains to the important related area in which relatively little research has been done, i.e., "How may a human user perceive grasping force and texture from his computer generated counterpart in the virtual environment?"

There are many peripheral devices which have been created to allow a user to enter information into the computer. The most notable of these is the standard QWERTY keyboard. Besides the numerous modifications of this "key input" concept, there are many other devices with their associated permutations. A partial list of such devices includes mice, joysticks, trackballs and Computer Aided Design (CAD) tablets. The main drawback of these computer input devices is that they don't permit human users to enter information in a manner which may be the most efficient and natural. For example, in a CAD software program, the human designer may wish to rotate a 3-D graphic representation of a block on a computer screen to view and modify the hidden side. Using currently available input devices, the designer must select the axis or a sequence of axes about which the object must be rotated to achieve the desired orientation and view. After the desired axis is selected, the amount of angular rotation must be determined, usually by the linear motion of a mouse or by entering the desired amount of rotation as a decimal quantity via the keyboard. This whole procedure seems very awkward and unintuitive when compared to what a person would normally do when confronted with a similar task in the "real world," i.e., he would simply reach out, pick up and rotate the object? Providing feedback for this more natural approach to object/environment interaction is an object of this invention.

Instrumented gloves which provide digit position information to the computer have been used to manipulate simulated objects in virtual environments. Such gloves have also been used in telerobotics to control highly dextrous end effectors to grasp real objects. However, lack of force feedback to the glove wearer has reduced the effectiveness of these open-loop manipulation approaches. Imagine a 3-D graphic model of an egg on a computer screen. Suppose you are wearing a glove which maps your digit and hand motions to a graphic image of a hand on the same screen as the egg. As you move your hand and digits, the corresponding graphic images of the hand and digits move in a similar manner. The task is to move your own hand and digits to control the graphic hand on the computer screen to pick up the egg. To accomplish this task you must provide enough force to reliably grasp and lift the virtual egg, but not so much force such that the egg is crushed. Without some kind of grasping force and tactile feedback, this task would be extremely difficult.

Attempts have been made to provide information about simulated contact with virtual or telemanipulated objects to senses other than the corresponding tactile senses. One method of simulated feedback which has been tested uses audible cues. For example, the computer may beep when contact is made. Another simple method is to highlight the object once contact is made. Both these methods will require the user to re-learn hand-eye coordination. It may be frustrating and time consuming for the user to learn one of these "unnatural" methods of grasping an object, and the sensation of interacting in a virtual environment will be reduced.

SUMMARY OF THE INVENTION

An object of the invention is a man-machine interface which may be employed in interactive computer applications.

Another object of the invention is a force feedback control system capable of controlling a set force to a selected part of the body, e.g., the digit tip.

Still another object of the invention is a man-machine system capable of simulating textures on a selected part of the body, e.g., the digit tip.

Yet another object of the invention is a man-machine interface comprised of a glove capable of sensing digit and hand positions and hand orientation, which may exert and dynamically vary and control the forces applied to each digit, and which may vary the tactile array pattern presented to each digit tip.

Another object of the invention is a digitial control system capable of sensing the force applied to the digit tip and capable of using this signal to control the digit tip force to a desired force set point which may vary as a function of digit position.

Still another object of the invention is a force and texture feedback system which may be employed in many different applications, such as virtual environments, telemanipulation and interactive 3-D graphics and Computer Aided Design (CAD).

A feature of the invention is the use of a flexible housing which may comprise one or more concentric flexible casings which guide a force-transmitting flexible elongated element such as a flexible, low friction/stiction, low modulus of elasticity thread or a shape memory alloy wire which serves as a tendon and is used in tension to apply force to a sensing body part or to actuate texture simulating elements.

Another feature of the invention is the use of a flexible housing which may comprise one or more concentric inelastic tubes to guide a force transmitting flexible elongated element such as pneumatic or hydraulic fluid to a sensing body part to be used by a force applicator to apply force to the sensing body part.

Still another feature of the invention is the use of force actuators to generate force which is transmitted to the sensing body part via flexible tendon cables, or pneumatic or hydraulic tubes, and used by a force applicator to apply force to the sensing body part.

Yet another feature of the invention is the use of force or displacement actuators to generate displacement which is transmitted to a sensing body part via flexible tendon cables, or pneumatic or hydraulic tubes, and used by a texture simulator to simulate textures on the sensing body part.

Yet another feature of the invention is the use of a support to which the flexible tendon cables or tubes are secured. The support may be a reinforced wrist-strap when the sensing body part is part of the hand.

One embodiment of the invention presents, for the first time, the use of a glove incorporating not only sensors which provide analog values representing digit and overall hand motion, but also true force feedback to the wearer's digit tips relating the amount of force a corresponding graphic (or actual) device is applying to a given virtual (or telemanipulated) object. The invention also relates to a means whereby simulated texture and edge orientation may be presented to a user.

The invention, which senses one or more body part positions and provides force and texture feedback to one or more body parts, permits a relatively "natural" method of computer interaction. The subject device provides in a single unit: (1) controlling body part position-sensing means employing a plurality of signal producing means associated with individual movable controlling body parts, where the signal is related to controlling body part position, with the individual signals analyzed to define a composite signal. The signal producing means may be anything which provides body part position and/or orientation, including strain gage, electromagnetic, ultrasonic, piezoelectric, hall effect, infrared emitter/detector pair, encoder/potentiometer, laser scanning or other optical position (and/or orientation) sensors; (2) force-applying means which may be anything which provides force information to a sensing body part; and (3) force-sensing means which may be anything which provides a force measurement signal; and (4) texture-applying means (e.g., an array of texture elements) which may be anything which provides surface pattern (e.g., texture) information to a sensing body part; and (5) force-generating means which may be any actuator which generates a force (or displacement), including electrical, electromagnetic, electromechanical, pneumatic, hydraulic, piezoelectric, shape memory alloy (e.g., Nickel/Titanium alloys), vapor pressure actuators; and (6) force-transmitting means (e.g., a flexible, inelastic tendon guided by a flexible, incompressible housing, or an incompressible fluid guided by an inelastic housing) which may be anything which transmits a force signal from a force-generating means to an applying means (e.g., a force-applying means or a texture-applying means); and (7) signal collection and producing means (e.g., a processor or computer) which may be anything which collects signals (e.g., from the position-sensing and/or force-sensing means) and produces signals (e.g., for the force-applying and/or texture-applying means); and (8) support structure (including clips, straps, clamps, guides, pockets, material, etc.) used o support the body part sensing means, the force-applying means, the texture-applying means, the force-generating means, the force-transmitting means and the signal collection and producing means.

The signal associated with the controlling body part position-sensing means may be coordinated with the force applied to a sensing body part and also with the texture applied to a sensing body part. For example, the signal produced by the controlling body part position-sensing means may be used by a signal collection and producing means to manipulate a multiarticulated computer generated interactive entity in a virtual environment. The force-applying means may apply force to a sensing body part in relation to the interaction between the interactive entity and a component of the virtual environment. In addition, the texture-applying means may be associated with a surface pattern informative signal and apply a texture to a sensing body part to further enhance the sensation of reality in relation to the interaction of the entity and a component of the virtual environment.

A particular application for the invention is to sense and provide force and texture feedback to the hand. A useful embodiment for the invention when used for the hand is a "feedback glove." The feedback glove embodiment is comprised of means for measuring position and orientation of the hand, means for measuring individual joint angles, means for applying force to various parts of the hand, means for sensing the applied force, and means for applying selected textures to various parts of the hand. Many of the specific descriptions of the invention will be centered around the feedback glove, however, the sensing and structures described for the glove may be easily translated to other body parts (e.g., arms, legs, feet, head, neck, waist, etc.).

In a preferred embodiment of the feedback glove, the means for providing position and orientation of the hand is a Polhemus ™ electromagnetic position sensor. The individual joint angle sensing means is comprised of two long flexible strain gages mounted back to back. The strain gage assemblies re ide in guiding pockets sewn over each joint. When a joint is flexed, one of the strain gages of the corresponding pair of gages is in tension, while the other strain gage is in compression. Each pair of two train gages comprise the two legs of a half bridge of a common Wheatstone bridge configuration. An analog multiplexer is used to select which of the half bridge voltages is to be sampled by an analog-to-digital converter. The maximum strain experienced by each gage is adjusted by varying the thickness and elastic modulus of the backing to which the gages are mounted. The backing is selected to maximize the signal output without significantly reducing the fatigue life of a gage. These joint angle strain gage sensors are disclosed in the Kramer et. al. patent application Ser. No. 07/258,204 and are incorporated herein by reference.

The means for applying force to parts of the hand is comprised of a means (e.g., an electric motor) for generating a desired force, a means (e.g., a flexible tendon/casing assembly) for transmitting the generated force to a force-applying means, and a means (e.g., a force-applying platform) for transferring the force to a specific part of the hand (e.g., the digit tip). The means for applying texture to parts of the hand is comprised of a means (e.g., an electromechanical solenoid) for generating a desired displacement, a means (e.g., a flexible tendon/casing assembly) for transmitting the generated displacement to the hand, and a means (e.g., an array of texture elements) for applying a surface pattern to a specific part of the hand (e.g., the digit tip). The embodiment includes structure which supports both ends of the tendons and casings, and also supports the force and textureapplying means.

The glove, which embodies joint angle sensors and also the force and texture feedback apparatus, overcomes many of the problems of joint sensing devices which do not embody force and texture feedback. The feedback glove simulates contact and grasping information in a "natural" manner to a user and facilitates many tasks, such as those arising in interactive 3-D graphics and telerobotics. The feedback glove may be used to feedback texture information from distal "virtual" objects in a virtual environment of from "real" objects when used in telerobotic applications.

When used with appropriate animation and control software, the feedback glove provides joint angle sensing and sufficient tactile feedback for a user to control an interactive entity, such as a computer generated graphic representation of his hand to reliably grasp a virtual object, such as a cup, or any object which appears as a graphic model on a display device. Some virtual objects are programmed to demonstrate physical properties similar to real objects, such as weight, contour, stiffness and texture. These, and other features, may be sensed and the virtual objects manipulated using the feedback glove. The force feedback incorporated into the glove relays the virtual grasping force information to the user, while a texture simulator allows the user to sense orientation and motion of edges simply by "touching" virtual objects with his own computer simulated virtual digits.

The feedback glove, which provides joint angle sensing and force and texture feedback, may also be used for telerobotics. For this application, the feedback glove provides joint angle information which is used to control an interactive entity, such as a robot manipulator, to grasp a distal real object. The force and texture feedback of the glove provide the user with the actual gripping force and the object contours sensed by the robot's gripper, so the real object may be reliably grasped and manipulated without dropping or crushing.

A glove using force feedback may also be programmed to teach digit dexterity, digit timing and even the motions necessary to learn some musical instruments. For example, if the user were learning the piano, as digits are flexed, the user would receive digit tip pressure form virtual keys signifying to the user that he had pressed the key. Tendons similar to those positioned on the dorsal side of the digits to restrict digit flexure may also be placed on the palm side of the hand. These palm-side tendons may be used to force the digits into the desired flexed positions or to restrict the digits from extending. These tendons would be used in the case when the user wanted to be "taught" to play the piano and wanted his digits to be properly positioned and flexed for him at the proper times. The idea of this example may be extended from a virtual piano to other virtual instruments and even to other devices such as a virtual typewriter. The feedback glove could be used to teach someone to type, and when learned, to allow the user to generate text by "typing in the air."

More specifically, the invention is a man-machine system which, in addition to measuring actual human joint angles, provides two feedback sensations to the user. The first sensation is force. In a preferred embodiment, a small device is attached to the digit tip of a joint-angle sensing glove and holds a force-applying platform in juxtaposition to the digit tip. The force-applying platform is displaced from the digit tip (by about 4 mm) by a retractable means (e.g., a leaf spring) when unactivated, but is capable of quickly contacting the digit tip and applying a dynamically selectable force when activated. The sudden impact of the force-applying platform provides a sensation similar to that perceived when the actual digit tip contacts an object. Thereafter, the force-applying platform presses against the digit tip with a programmable force which may relate the amount of force that a virtual digit is pressing against a virtual object.

In a preferred embodiment, the force that is applied by the force-applying platform to the digit tip is transmitted from a force generating actuator (a.d.c. servo motor) via a high tensile strength, flexible tendon enclosed in a flexible non-compressible tubular casing. The function of this assembly is similar to a bicycle brake cable. Other embodiments may employ force actuators based on electrical, electromagnetic, electromechanical, pneumatic, hydraulic, piezoelectric, shape memory alloy (e.g. Nickel/Titanium alloys), vapor pressure, or other suitable echnologies. In choosing the appropriate actuator technology, various factors should be considered, such as speed of response, force output, size, weight, cost and power consumption.

One end of the tendon casing is secured near the force actuator and the other end is secured to a wristband near the feedback glove. As a tendon emerges from the end of the casing secured to the wristband, it is guided by sections of casing affixed to the glove material until the tendon reaches its designated final location. Tendons which are to provide a force to restrict the wearer from flexing a digit are guided from the wristband across the back side of the hand to the final location. A preferred embodiment has these tendons passing across the back of each digit and has them mechanically connected to the force-applying platform at the digit tip. In addition, a tendon may be terminated at any properly reinforced intermediate glove location.

As tension is increased, tendons which pass along the back side of a digit press against the joints and do not tend to pull the glove material away from the hand or digits. The tension of the tendon restricts the joints over which the tendon passes from flexing in a direction which attempts to extend the tendon further.

To provide a force to restrict the wearer from extending a digit or to actually drive a digit into a flexed position, tendons are guided across the palm side of the glove by sections of casing. In a preferred embodiment, these tendons are guided to the digit tip where they are ultimately secured to a force-applying platform, but they may also terminate at properly reinforced intermediate positions. Unlike the case where the tendons are guided along the back-side of the hand, when the tendons which are guided along the palm-side of the hand are in tension, they tend to pull the casing sections (and hence the glove material) away form the hand. Although not necessary, if it is desired to guide these tendons along the surface of the palm and digits as they pass from where the casings are secured to the wristband to their final designated locations, the glove must be appropriately reinforced between each joint.

Where the tendons are routed and where they are ultimately secured to the glove will determine the forces applied to the hand by the tendon. Forces and torques applied to parts of the hand by a single tendon may not be controlled independently. Only the force applied to one part of the hand or the torque applied by the tendon to an individual joint may be controlled. In a preferred embodiment, the tendons are fastened to the force-applying platforms at the digit tips, and the forces at the digit tips are controlled, not the torques applied to the joints. To isolate the force and independently restrict motion of a single intermediate joint, a separate tendon is used. Its casing is secured just prior to the joint, and the tendon is fastened to a force-applying platform just beyond the joint. As previously mentioned, the glove is properly reinforced near the joint so the glove material doesn't unduly stretch under the force of the tendon.

When force is initially applied by a force actuator, the force will appear between the wristband and the intended digit. Therefore, the wristband will tend to move towards the digit as the "slack" in the skin on the wrist is taken up. Once this slack is taken up, the wristband will stop moving, and the digit will experience the full tendon force (except for frictional losses). To provide a realistic contact sensation, the force actuator must have sufficiently high bandwidth such that this slack take-up time is insignificant when compared to the bandwidth of digit motion.

In a preferred embodiment, the actual force at the digit tip is sensed and fed back to a servo control system. The control system controls the output of the force actuator such that the force applied to the digit tip follows a desired force profile regardless of the undesireable compliance of the skin on the wrist. The force profile for any digit is a function which produces a desired force set point for any given digit and hand position. That is, as either the digit or hand changes position, the force applied to the digits varies accordingly. For example, a force profile may be generated which simulates the force sensation of a push button switch that gradually increases its opposing force as the button is depressed until it reaches its toggle point, clicks, and releases most of its resistive force.

In addition to providing object contact and force information, the invention describes a means whereby object textures and edge orientations may be perceived. For one embodiment, the previously described digit tip force applicator may be modified to include an array of small stimulators, called texture elements. These elements produce a surface pattern (e.g., a simulated texture) in addition to providing force feedback. Each texture element may be individually selected. The texture element may be a small pin which extends when selected and the amount of its extension may be programmed. The texture element may also be a pair of electrodes, and tactile sensation produced via electrocutaneous stimulation.

In a preferred embodiment, the texture elements are driven by a texture displacement actuator. A flexible bundle of force feedback and texture simulating tendons connect the glove to both the force and texture actuators. The type of displacement actuator for a texture element may vary. A particular embodiment may employ binary or linear displacement acuators and the actuators may be based on electrical, electromagnetic, electromechanical, pneumatic, hydraulic, piezoelectric, shape memory alloy, vapor pressure and othe suitable technologies. In choosing the appropriate actuator technology, various factors should be considered, such as speed of response, force output, size, weight, cost and power consumption. If pneumatics or hydraulics is used, a hermetically sealed flexible tubing assembly is used to connect the texture actuator to the texture element. Otherwise, the connection may employ a cabling means comprised of a tendon inside a casing, similar to that used to transmit the force from the force actuator to the force applicator.

If a binary actuator (e.g., a two-state solenoid) is used, then the texture element will either be fully extended or fully retracted. If a linear actuator is chosen (e.g., a d.c. servo motor) then the extension of the texture element may be continuously varied. The force with which the texture is presented to the digit tip is determined by the force actuator. The pattern of the texture array may be varied with time and reflect changes in the position of the joints or hand. For example, by dynamically varying the texture array, a user may perceive his virtual digit moving over various (e.g., smooth/rough) virtual surfaces. Using the time varying texture array, a user may also determine the edge orientation of a virtual or telemanipulated object.

BRIEF DESCRIPTION OF THE DRAWINGS

FIG. 1b is a cross-section of the perspective view of FIG. 1a.

DETAILED DESCRIPTION OF ILLUSTRATIVE EMBODIMENTS

Figure 1A:
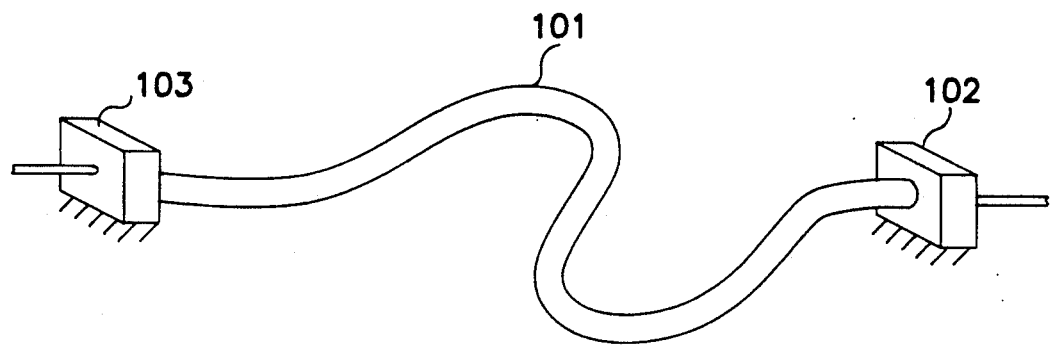
FIG. 1a is a perspective view of a tendon/casing assembly.
Figure 1B:
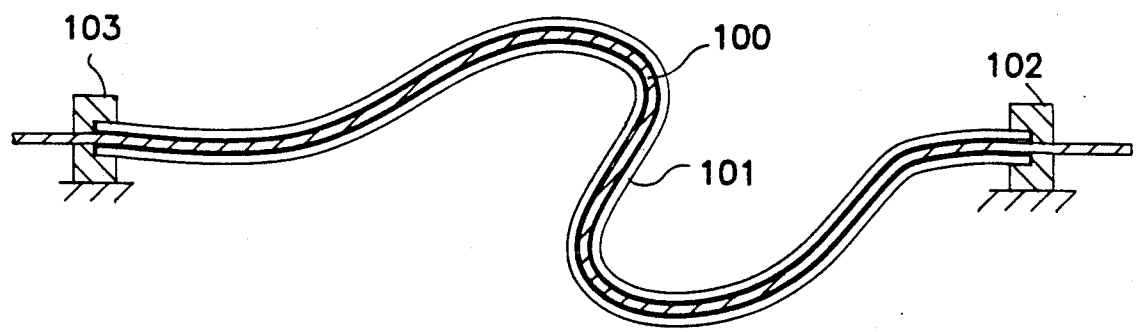

FIGS. 1a and 1b show how the force generated by a force actuator is transmitted to a chosen location. More specifically, FIG. 1a shows a perspective view of the tendon assembly, and FIG. 1b shows a cross-section view. The tendon assembly is comprised of a low friction, high modulus of elasticity and high tensile strength, flexible tendon cable 100 (e.g., Dacron TM 20 lb. test fishing line or Kevlar TM thread) inside an assembly employing one or more concentric flexible, low-compressibility tubular casings 101 (e.g., Teflon TM tubing). One end 102 of the casing assembly is secured near the force actuator and the other end 103 of the casing is secured near the location where the force is to be applied (e.g., the casing may be secured to the wristband, and the force applied to the digit tip). By using a plurality of concentric casings (e.g., a #20 Teflon tube inside a #14 tube) rather than simply increasing the thickness of the wall of a single casing, the resulting tendon casing is more flexible (since the casings may slide relative to each other) and still produces an overall compressive strength nearly equal to that of a single casing of equivalent wall thickness.

Figure 2A:
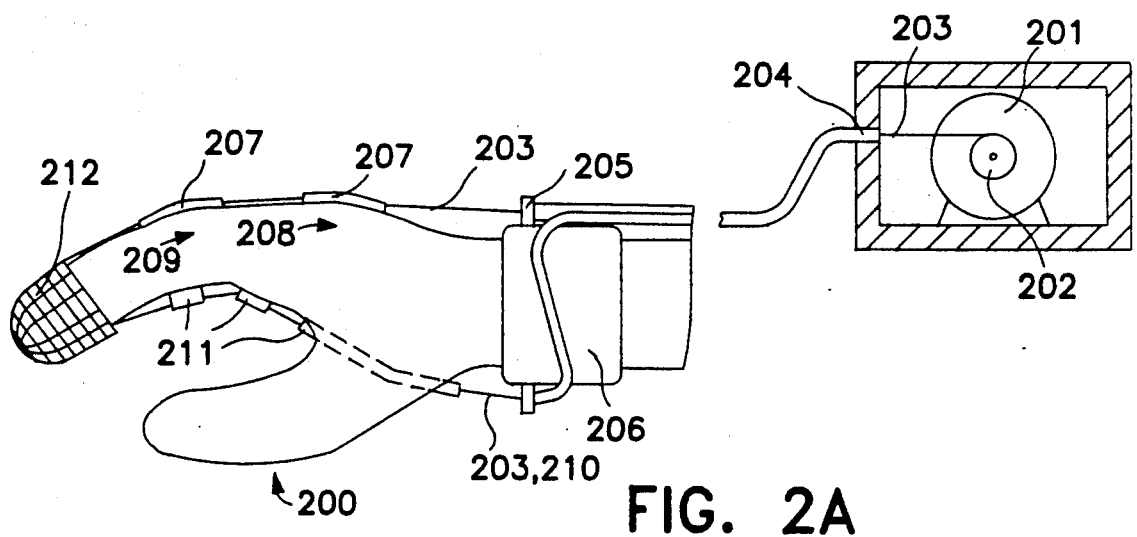
FIG. 2a is the side view of an embodiment of the invention showing the force-transmitting tendon assembly affixed to a glove.

FIG. 2a is a side view of a force feedback tendon assembly affixed to a glove 200. In this embodiment, each tendon force is generated by a d.c. servo motor 201. The motor is driven by a current amplifier so that a motor torque is produced which is proportional to the amplifier current. This torque is converted to a tendon force by the tendon pulley 202 on which the tendon cable 203 is wound. By securing one end 204 of the tendon casing near the motor and the other end 205 to the glove's reinforced wristband 206, the tendon force produced by the motor may be transmitted to the glove. In a preferred embodiment of the invention, the wristband is comprised of a sturdy, reinforced strap with Velcro TM backing wrapped around a thin, rubber (e.g., polyurethane) intermediate layer. The rubber layer provides a comfortable interface between the reinforcing strap and the user's wrist. The strap is made from a heavy-duty thread (e.g., canvas) which is woven to allow it to be flexed around a wrist, but to otherwise provide a sturdy support. In general, the wristband may be manufactured from a variety of materials such as foam padded injection molded plastic. The wristband may be manufactured as part of the glove or made as a separate unit.

The tendon cable passes through a series of tendon guides 207 as it extends beyond the point where the casing is secured to the wristband on its way to the digit tip force applicator. In one embodiment, the tendon guides for the back side of the hand are made from flexible, but incompressible casing (e.g., Teflon tubing) and fastened over the metacarpophalangeal (MP) 208 and proximal interphalangeal (PI) 209 joints. These guides prevent the tendons from moving laterally and slipping off the sides of the joints as the knuckles protrude during flexure. In the embodiment where the glove has tendons 210 on the palm side of the hand, and it is desired to have the tendons remain close to the hand when they are in tension, tendon guides 211 are located between the MP and PI joints and also across the palm to keep the tendon from pulling away from the glove. The glove is also reinforced in a variety of places to prevent the glove from being pulled away from the hand by the tendon guides.

The digit tip force applicator 212 (shown generically by the cross-hatched protion of the digit tip) applies both back-side and palm-side tendon forces directly to the digit tip. Also on the digit tip force applicator assembly is a force transducer for each tendon which senses the actual force applied to the digit tip. These force signals are fed back to the motor force control system which makes appropriate adjustments such that the desired force profile is preceived by the user.

Figure 2B:
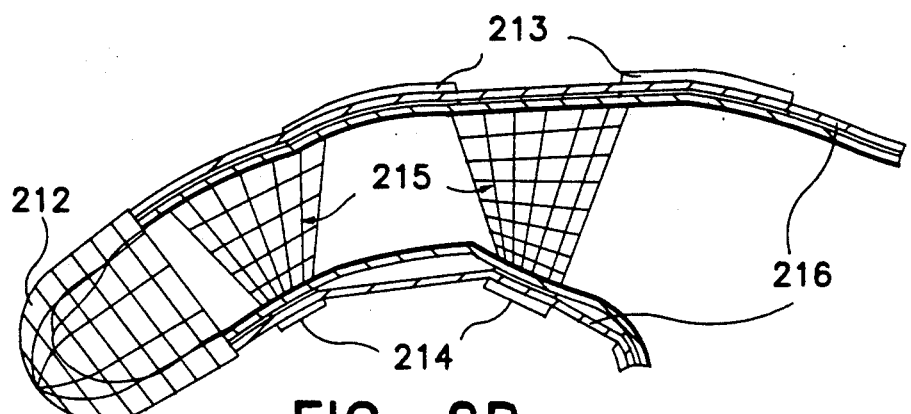
FIG. 2b is a cross-section view of an embodiment of the invention which shows tendons affixed, via tendon guides, to material covering a digit: one tendon to the back side and one tendon to the palm side of the digit.

FIG. 2b is a cross-section view of an embodiment of the invention showing force feedback tendons 216 passing through guides on both the back 213 and palm 214 sides of a glove digit. Both tendons are attached to the force applicator at the digit tip. In a preferred embodiment, when the tendon guides are affixed to an elastic glove, only the palm-side tendon guides need reinforcement to ensure that they remain against the digit when the tendon is in tension. One way to accomplish the reinforcement is to fasten additional material 215 of low elasticity (e.g., nylon, plastic, or metal) around the digit at the base of the tendon guide.

Figure 2C:
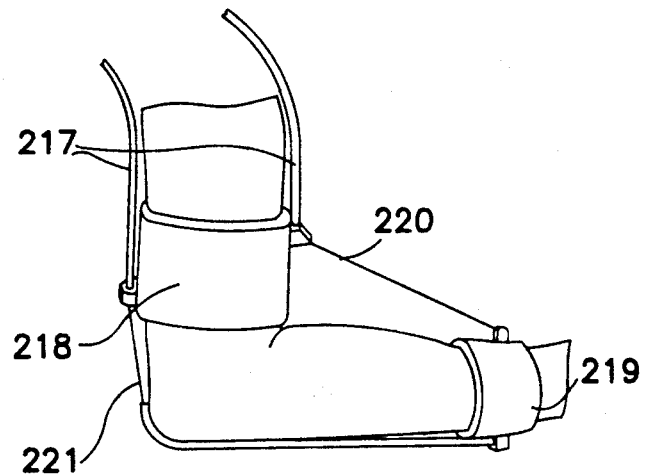
FIG. 2c is an embodiment of the invention which shows tendons affixed to provide force feedback to other body parts (e.g., the arm).

FIG. 2c shows a force feedback tendon/casing assembly applied to the arm. Casings 217 may be secured to a reinforced strap 218 worn around the bicep. The strap is similar in construction to the wristband previously described and also employed here. Both the tendons shown exit the casings on the bicep and are affixed to the wristband 219. One tendon 220 provides a force which restricts the elbow from extending while the other tendon 221 provides a force which restricts the elbow from retracting. Assemblies similar to the ones shown in FIG. 2a–2c may be incorporated into a "feedback *body* suit," i.e., a suit which covers all, or portions of the body, and which can apply force and texture information to various parts of the body.

Figure 3:
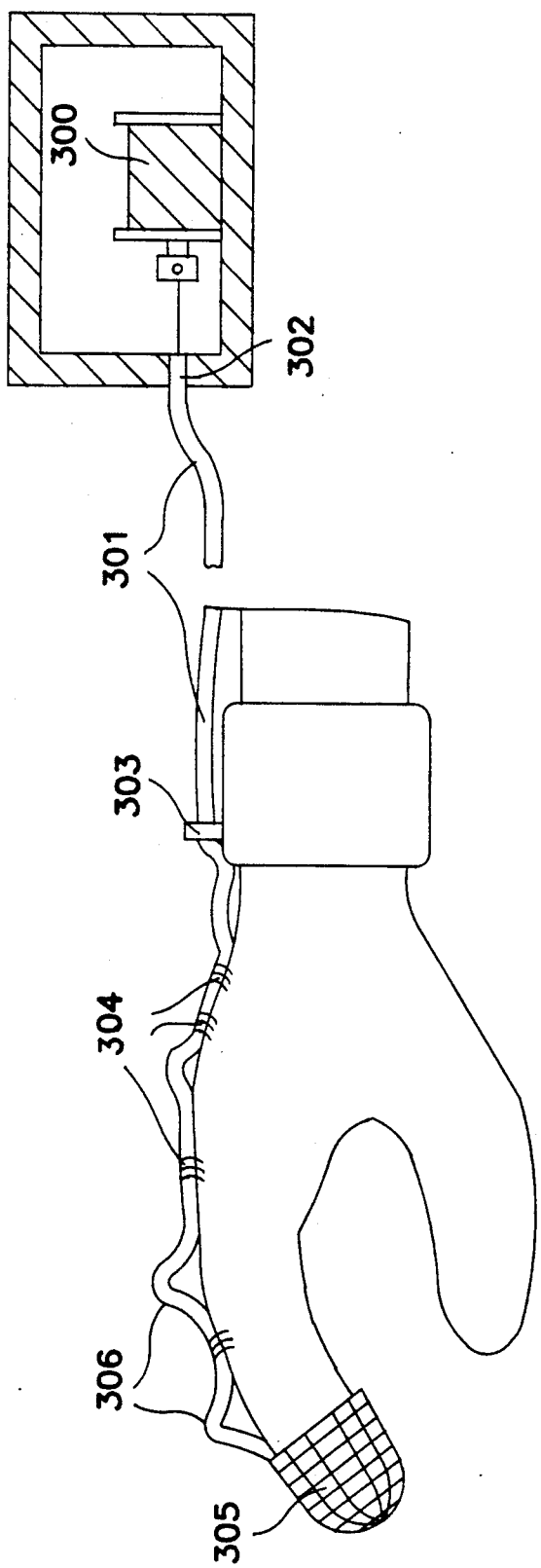
FIG. 3 is the side view of an embodiment of the invention showing the texture simulating tendon assembly affixed to a glove.

FIG. 3 is a side view of a texture simulating tendon assembly affixed to a glove. The tendon displacement in this embodiment is generated by a two-state electromechanical solenoid 300 and is transmitted to the digit tip via a tendon and casing assembly 301. The tendon assembly shown here is similar in function to the tendon assembly described earlier for FIGS. 1a and 1b, however, the diameter of both the tendon and casing may be smaller since the forces these texture tendons need to exert are less than the forces exerted by the force feedback tendons.

One end 302 of the tendon casing for the texture simulator is secured near the displacement actuator, and a point 303 near the other end of the casing is secured to the glove's reinforced wristband. After the casing is affixed to the wristband, it continues on and is fastened to the glove at various locations 304 between the joints on its way to its designated final location, which in this embodiment is the digit tip texture simulator 305. Casings may be affixed to the glove by such means as sewing or gluing, or the casings may be molded directly onto/into the glove. In the embodiment shown, there is slack 306 in the casing between points where it is affixed to the glove to allow for the tightening of the casing when the digits are bent. The casings may also be guided along the sides of the digits without allowing for slack since they won't be stressed when the digits are bent.

Figure 4A:
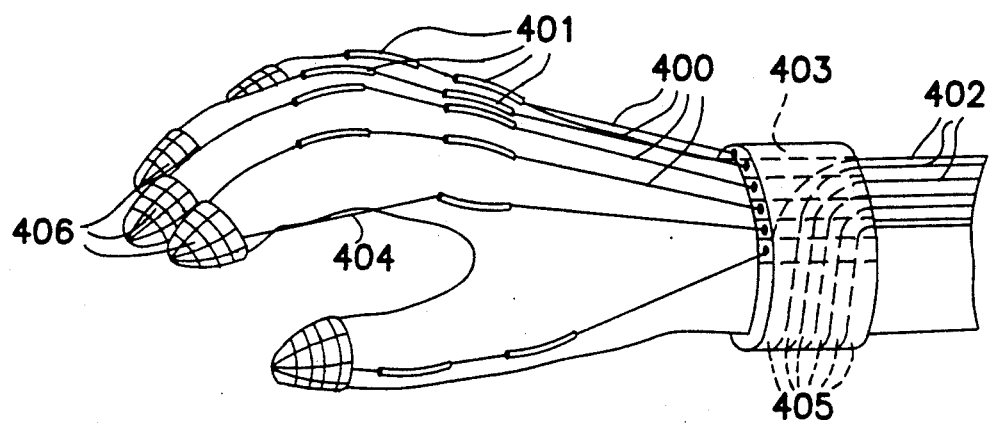
FIGS. 4a and 4b show an embodiment of the invention where force tendons are affixed, via tendon casings, to both the palm and back side of the digit tip of a glove. One end of the tendon casing is secured to a wrist portion of the glove, and the other end is fastened to the force applicator assembly on the digit tip.

FIG. 4a shows a plurality of force feedback tendons 400 and their guides 401. Although the texture feedback discussed in FIG. 3 may be used simultaneously with force feedback, the texture producing tendons have been omitted from this drawing for clarity. The tendon casings 402 are shown secured to the reinforced wristband 403. In this embodiment, there is one tendon on the back of each digit to control the force applied to the digit tip. In addition, the figure provides an example of an abduction force feedback tendon 404 on the thumb side of the index digit.

Force is imparted to each tendon from a force actuator. In the embodiment shown, forces are transmitted to the glove via a tendon assembly similar to FIGS. 1a and 1b. One end of the tendon casings is secured near the force actuator, and at the other end is fastened to the glove's reinforced wristband. Tendons 405 intended for the palm side of the glove extend around the wristband as shown. These tendons 400 intended for the back side of the hand emerge from the casing on the wristband and are guided along the back surface of the glove by sections of casing 401 until they reach the desired final location. In the embodiment shown the final tendon location is the digit tip force applicator 406.

Figure 4B:
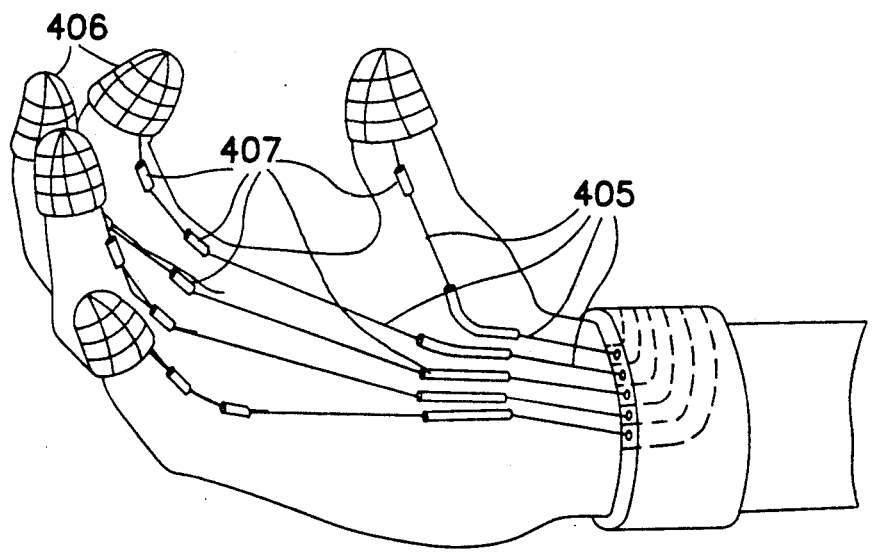

FIG. 4b shows a force feedback tendons 405 guided around the wristband to the palm side of a glove. The palm-side tendons then emerge from their casings on the wristband and are guided through sections of casing 407 on their way to the digit tip force applicator.

One useful yet uncumbersome and inexpensive embodiment of the invention employs force feedback tendons only along the back of the hand to the tips of the thumb and index digits, and employs texture elements only on the index digit tip. This "reduced" embodiment is in contrast to employing both force feedback and texture simulation to each joint of all five digits. The reduced embodiment provides the wearer with sufficient force feedback information to grasp most virtual objects and also allows the wearer to sense virtual textures with the index finger. Although, employing force feedback to all joints on all digits and texture simulation to all digits tips will provide the wearer with a more realistic simulation of his virtual environment, the increase in realism may not outweigh the added cost and complexity of the system.

Figure 5A:
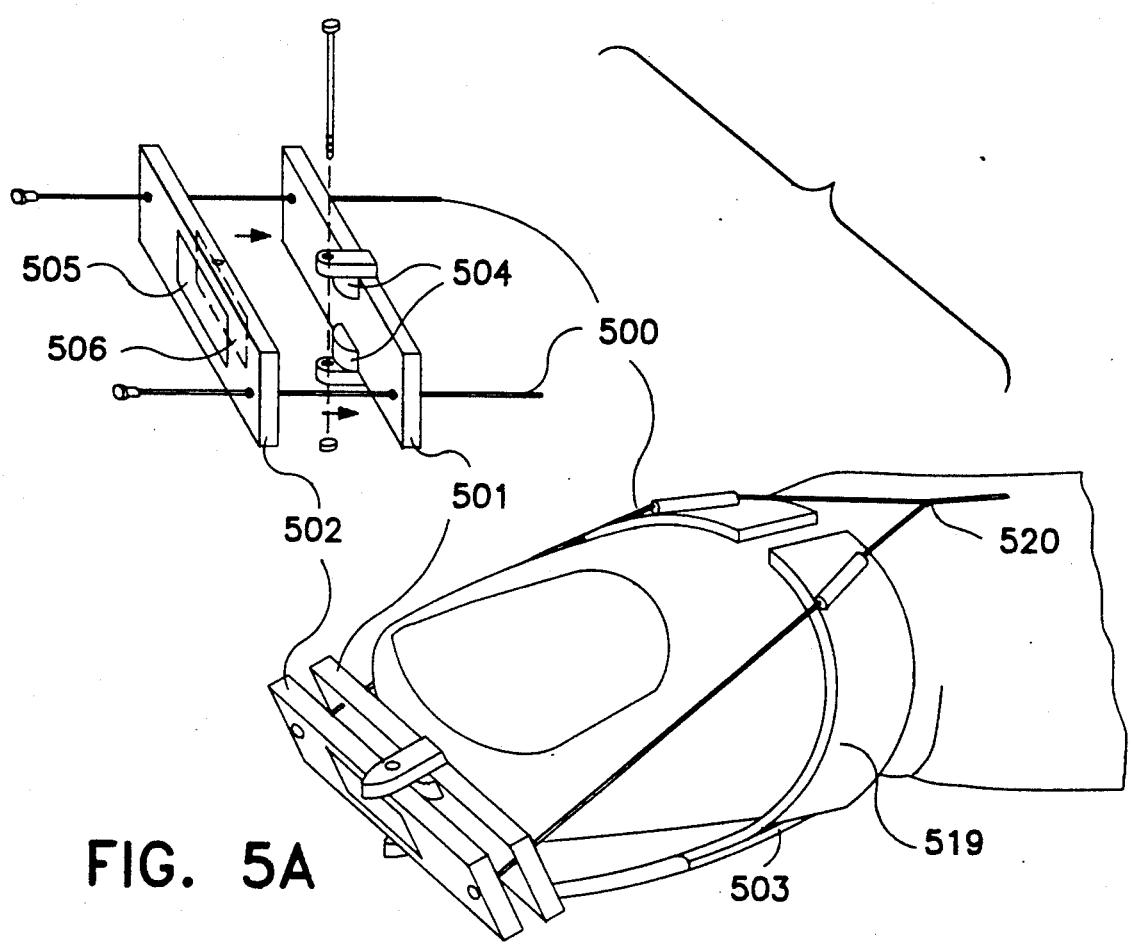
FIGS. 5a-5h, and FIGS. 6a-6c show various force applicator embodiments.
Figure 5B:
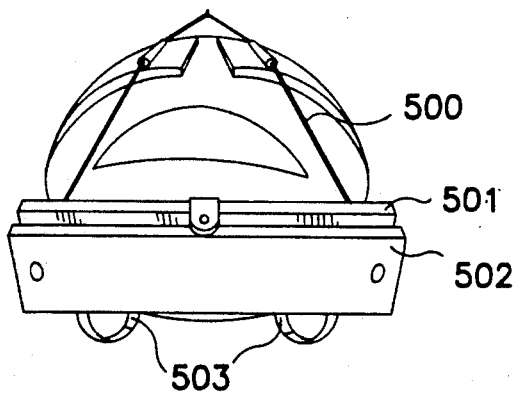
Figure 5C:
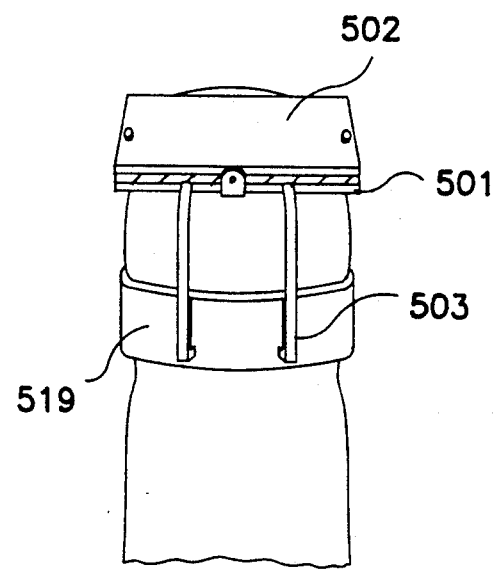
Figure 5D:
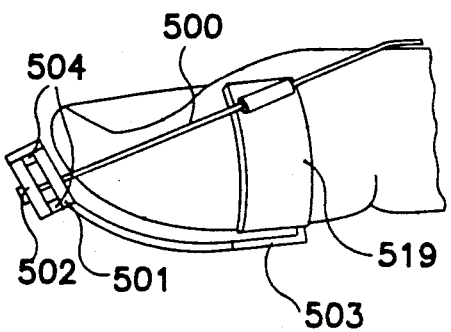
Figure 5E:
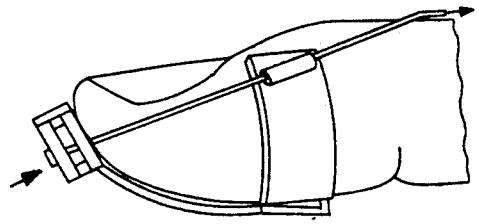
Figure 5F:
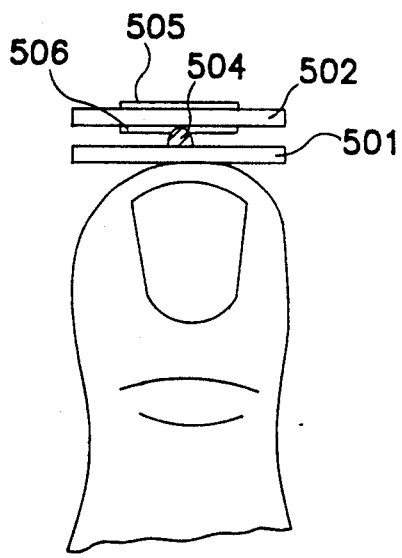

FIGS. 5a–5e shows a digit tip force feedback applicator which is comprised of a force-applying platform and a force-sensing platform. FIG. 5a is a perspective view, FIG. 5b is a front view, FIG. 5c is a bottom view, and FIGS. 5d and 5e are side views. Modifications may be made to this functional design without departing from the scope of the invention. The force feedback applicator may be manufactured directly into the glove material (as might be done if the glove were molded from a type of plastic). The applicator may also be affixed to the glove externally after both the applicator and glove are manufactured separately. The force applicator may also be a device which is simply clipped to the digit tip after the glove is put on.

In a preferred embodiment, a force tendon 500 is guided from the force actuator to the force feedback applicator, splits into two tendons, each tendon passing by the force-applying platform 501 (e.g., though holes), and mechanically connected to the ends of the force-sensing means, which is a force-sensing platform 502. The force feedback applicator structure 519 provides support for holding the force-sensing and force-applying platforms in juxtaposition to the digit tip. The force-sensing platform is forced via the force of the tendon towards the digit tip. The force-sensing platform presses against the force-applying platform which then contacts and applies force to the digit tip (FIG. 5e). When there is little or no force in the tendon, the force-applying platform is displaced from the digit tip by about 4 mm and is held away by a retractable means such as small springs (FIG. 5d). Leaf springs 503 are employed in the embodiment shown. By keeping the force-applying platform displaced from the digit tip in an unactivated position until force is applied, bandwidth requirements of the force actuator are reduced. For example, when the invention is used to provide feedback from a virtual environment and a virtual object is grasped, the force-applying platform assumes an activated position and contacts the digit tip with a non-zero relative velocity, as would a real object when contacting the digit tip. If the force-applying platform were always in contact with the digit tip, very large tendon velocities and accelerations would have to be generated to provide the same contact sensation to the user.

The force-sensing platform may be simply a strain gage beam which bends across a fulcrum 504 as tendon force is applied. The fulcrum shown in FIGS. 5a–5f is thin and concentrates the applied force over a small area such that the induced strain is easily measured by the two strain gages 505,506 mounted differentially to either side of this force-sensing platform.

Figure 5G:
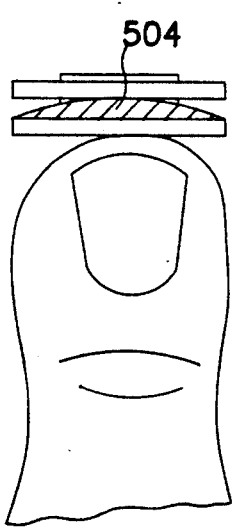

Alternative fulcrum designs are possible such as shown in FIG. 5g. By modifying the fulcrum shape and contour, various stress vs. tendon force profiles may be obtained. For example, the fulcrum design of FIG. 5g will provide a higher strain "gain" for low strains than the fulcrum of FIG. 5f, i.e., the detected strain will be large for small forces, but the strain gain will decrease as the force-sensing platform bends around the fulcrum. As the force-sensing platform bends around the fulcrum, the measured strain includes not only a component from bending but also includes a component from tension in the platform. By varying the contour, and thus the strain sensitivity of the force-sensing platform, small forces are detected with fine resolution, but the sensor will not saturate as quickly for higher strains. Further modifications of the fulcrum and platform geometries produce additional strain vs. force profiles.

As shown in FIGS. 5a–5g, when tension is applied to the tendon, strain gage 505 is in tension and strain gage 506 is in compression. Both strain gages are active and cover the area of the platform experiencing strain. Together, the two strain gages form a half bridge for a common Wheatstone bridge circuit which provides temperature compensation. The fulcrum and all other parts of the force applying platform that touch the force sensing platform are made from a thermally insulating material to insulate the strain gages on the force-sensing platform from the temperature fluctuations of the digit.

Figure 5H:
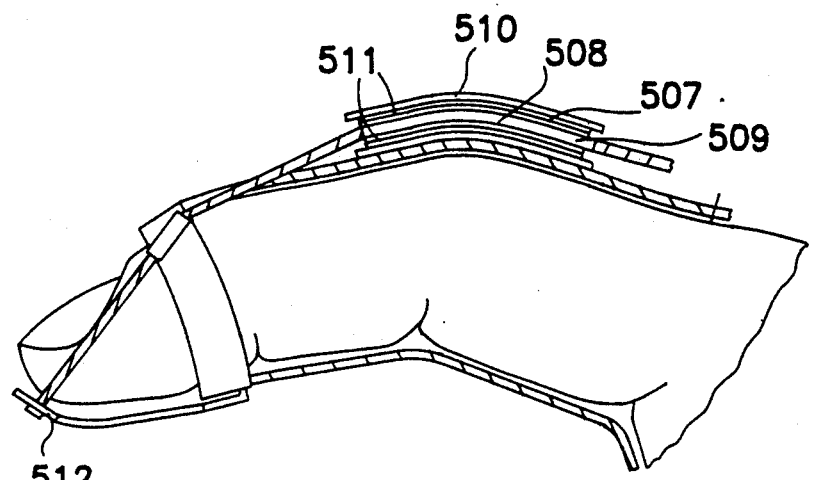

FIG. 5h shows a force-sensing means, comprised of two strain gages 507,508, mounted to opposite sides of a flexible stress-sensing element 509 which is placed in series with the tendon and experiences a tensile force related to the tendon force. The stress-sensing element may be a flattened portion of the tendon itself. This stress-sensing element may be used to measure the tendon tension and/or the joint angles. One strain gage 507 is mounted to the top side of the element, while the second strain gage 508 is mounted to the bottom side. In the embodiment shown, the stress-sensing element is used to measure both tendon tension and joint flexure. Therefore, the entire gage-element-gage "sandwich" is positioned in, and slides freely through, the casing guide 510, which has a rectangular cross-section in this region. Both gages are covered with a smooth, flexible encapsulation 511 (e.g., a type of plastic) which provides the surface that slides against the casing. The differential signal from the two gages is used to determine the joint angle, while the common mode signal from the same two gages provides a measure of the tendon tension. The stress-sensing element may be made from a non-flexible material and located between joints when only a measure of tendon tension is desired. The force in the tendon near the digit tip closely approximates the force applied by the force-applying platform to the digit tip. If the tendon tension is found using the stress-sensing element described here, the force-sensing platform previously described may be removed from the digit tip force applicator, and the mechanical design may be simplified to a single platform 512.

Figure 5I:
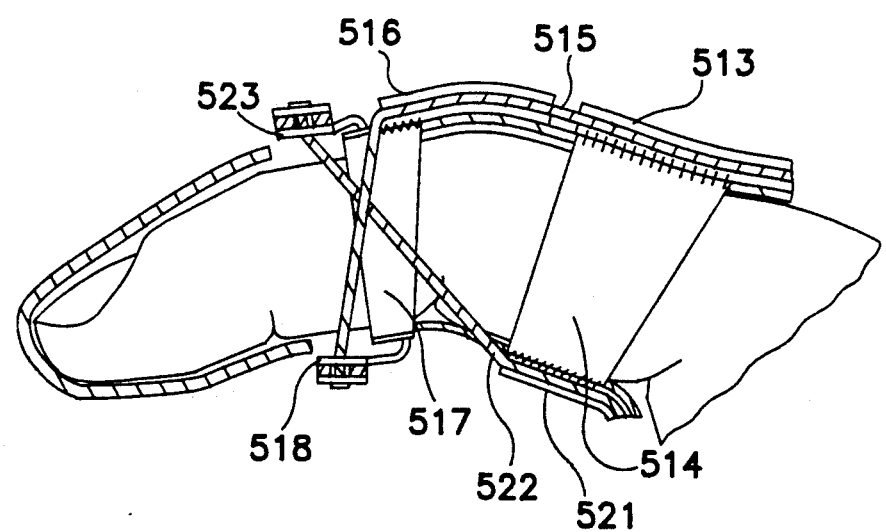

FIG. 5i shows how a force may be focused to restrict flexure of a single joint (e.g., the metacarpophalangeal joint as shown in this figure). The tendon casing 513 is secured to a first reinforced section 514 of the glove just prior to the selected joint. The tendon 515 exits the main casing and is guided over the joint by a section of casing 516, which is fastened to a second reinforced section 517 of the glove. The tendon exits the casing and forks into two tendon parts (as is shown 520 for the digit tip force-applying platform of FIG. 5a). The two tendon parts pass around opposite sides of the digit and are affixed to opposite ends of the force-applying platform 518, which is secured to the second reinforced section of the glove. The platform assembly contacts and presses against the digit when the tendon 515 is in tension.

The same method of operation can be applied to restrict the joint from extending as was described above to restrict the joint from flexing. A second tendon casing 521 is affixed to the first reinforced section of the glove. A second tendon 522 emerges from the casing and forks into two tendon parts. The two tendon parts pass around opposite sides of the digit and are affixed to opposite ends of the force-applying platform 523. The platform assembly contacts and presses against the digit when the tendon 522 is in tension.

Figure 5J:
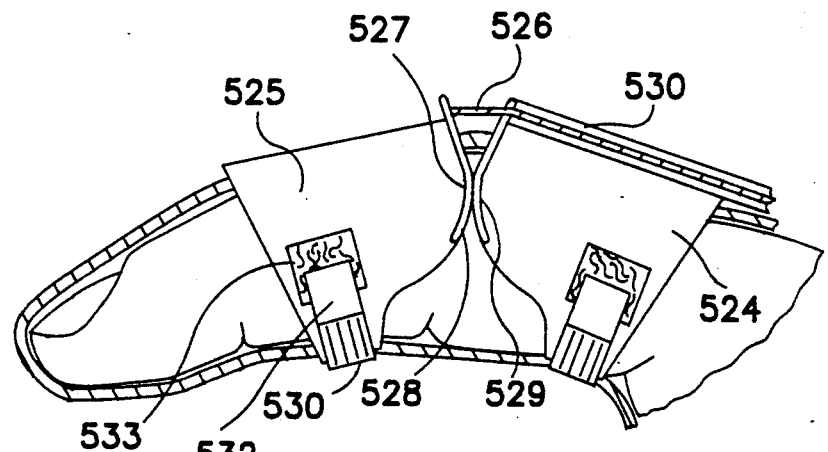

In the case where it is undesireable to reinforce the glove to support sections such as 514 and 517, FIG. 5j shows a way to provide force feedback to an individual joint of an unreinforced glove. If the glove of FIG. 5h were not reinforced near sections 514 and 517, then when tendon 515 was in tension, the two sections would be drawn towards each other. A possible solution would be to place a hinge between the sections to prevent them from simply sliding together. However, since the bend axis of a digit may translate and change orientation with bend angle, a single hinge would be uncomfortable for a glove wearer.

A preferred alternative to the "fixed hinge" solution is shown in FIG. 5j, where sections 524 and 525 are in contact with each other and produce a pivot surface 527 when tendon 526 (emerging from casing 530) is in tension. The pivot surface is created by the two mating flaps 528 and 529, which each have a characteristic surface contour designed to follow the average knuckle axis during flexure. As the tendon tension increases, the two sections press against each other and section 525 is forced to rotate clockwise, while section 524 rotates counter clockwise, each section rotating about the "moving" contact pivot point. The two sections are able to slide axially relative to the digit so they may contact each other when tendon tension is applied, and also so the same surface contours for the two sections will accomodate a variety of different knuckles. The two flaps, in addition to possessing a contour, may also have mating surfaces, such as mating groves, to prevent one surface from sliding off the other surface.

To keep the sections secured to the digits, the sections may be made from a solid, but elastic material (such as a plastic or spring metal), which is pre-formed to clip around the digit, as shown in FIG. 5j. The firm elastic strap 530 helps hold the two ends 531 of the clip together. One end of the elastic strap is permanently secured to one side of the clip, while the other end 532 of the strap is secured to the other side of the clip by Velcro 533. The elasticity of the clip, together with the elastic strap, hold the section firmly to the digit, but, since the clip and strap are elastic, they allow the digit diameter to expand when the digit is flexed.

Figure 5K:
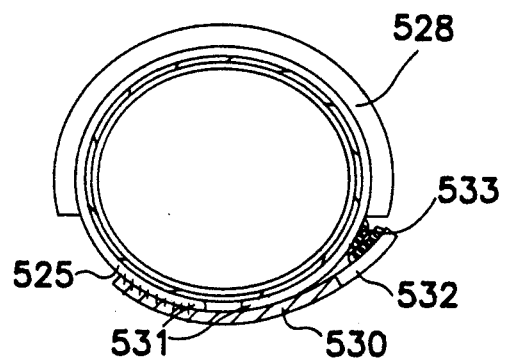
Figure 5L:
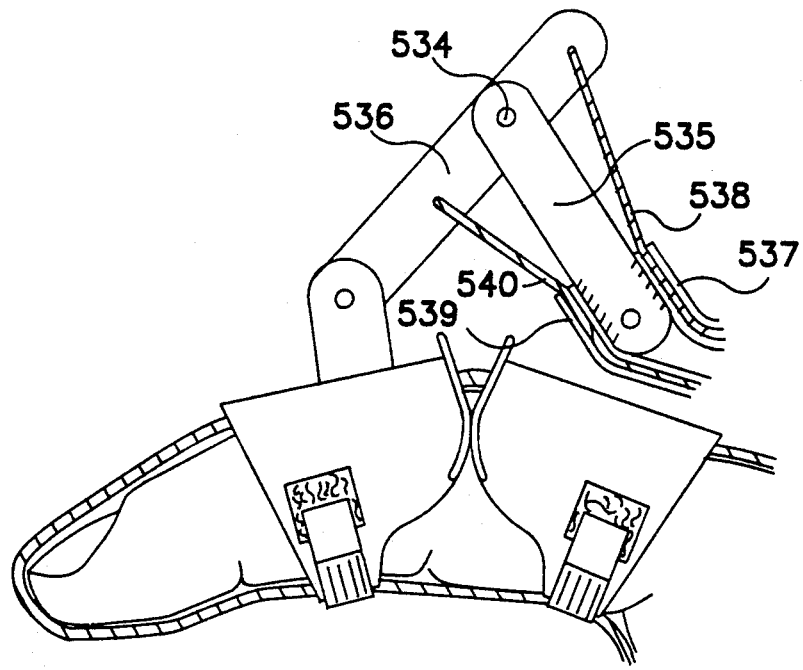

In some instances, it may be preferred to have a linkage attached to the sections, such as is shown in FIG. 5l. For example, if a rotary goniometer (e.g., a potentiometer, an optical encoder, or a rotary Hall effect sensor) were attached to the linkage at the joint 534 between the two links 535 and 536, the value of the goniometer may be related to the joint angle of the knuckle. When the linkage is employed, the force feedback assembly of FIG. 5j may still be used, however, as shown in FIG. 5l, the tendons may also be affixed directly to the linkage. A first casing 537 is affixed to link 535 and tendon 538 is affixed to link 536. Similarly, a second casing 539 is affixed to link 535 and tendon 540 is affixed to link 536. When tendon 538 is in tension, link 536 is pulled to rotate clockwise, forcing the digit to extend. When tendon 540 is in tension, link 536 is pulled to rotate counter clockwise, forcing the digit to flex.

Note that in FIG. 5l, supporting sections similar to those used in FIG. 5j are shown. If the glove is appropriately reinforced, other support sections, such as shown in FIG. 5i, may be used. Also note that in FIGS. 5j–5l, force-applying platforms may be employed to focus the applied force to a particular region of the digit. In addition, for clarity, force feedback tendons for the palm-side of the hand are not shown in FIGS. 5j–5l, however, they may be employed in an obvious manner.

Figure 6A:
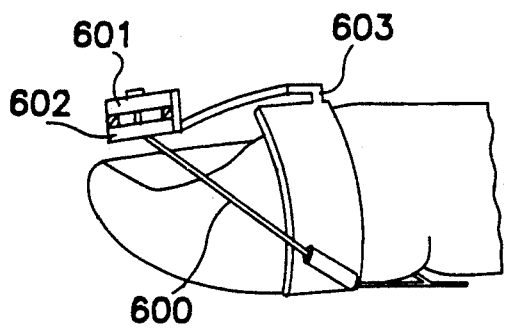
Figure 6B:
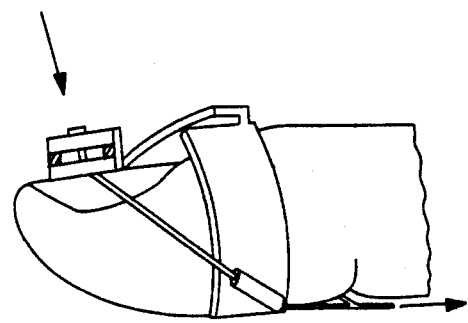
Figure 6C:
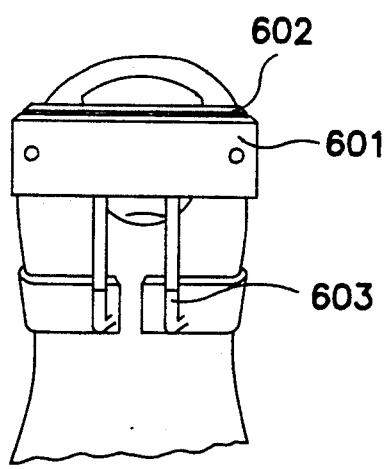

FIGS. 6a–6c show an embodiment of the force feedback applicator which produces force feedback from a tendon affixed to the palm side of the glove. This configuration provides a force which restricts the digit joints from extending and may also force them to flex. FIGS. 6a and 6b show side views, while FIG. 6c shows a top view. For clarity, only the apparatus specifically required for palm-side tendons is shown, but the force applicator may additionally include the apparatus shown in FIGS. 5a–5e. Tendon force is generated by an actuator and transmitted, as shown in FIGS. 1 and 2, to the force feedback applicator. As shown in FIG. 5a, the tendon 600 is guided past the force applying platform 601 (e.g., through holes), and is affixed to the force-sensing platform 602. The force-sensing platform again has two strain gages connected differentially in a half bridge configuration. The force-applying platform is also as before and has a stress concentrating, thermally insulating fulcrum on the side opposite to the digit. The insulating fulcrum prevents heat conduction from the digit to the gages on the force-sensing platform. The force-applying platform is displaced above the digit nail by springs (FIG. 6a) and contacts the digit nail only when a force is applied to the tendon (FIG. 6b). In the embodiment shown the springs are leaf springs 603. The applied tendon force presses the force-sensing platform into the force-applying platform which then presses against the digit nail. As the force-sensing platform presses against the force-applying platform, the platform is bent around the fulcrum and produces a strain in the gages indicative of the force applied to the digit nail.

Figure 7B:
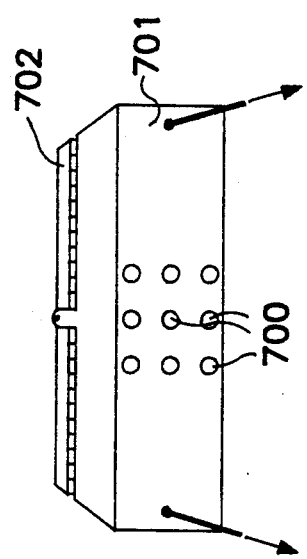
FIGS. 7a and 7b show the force applicator modified to simulate texture information.
Figure 7A:
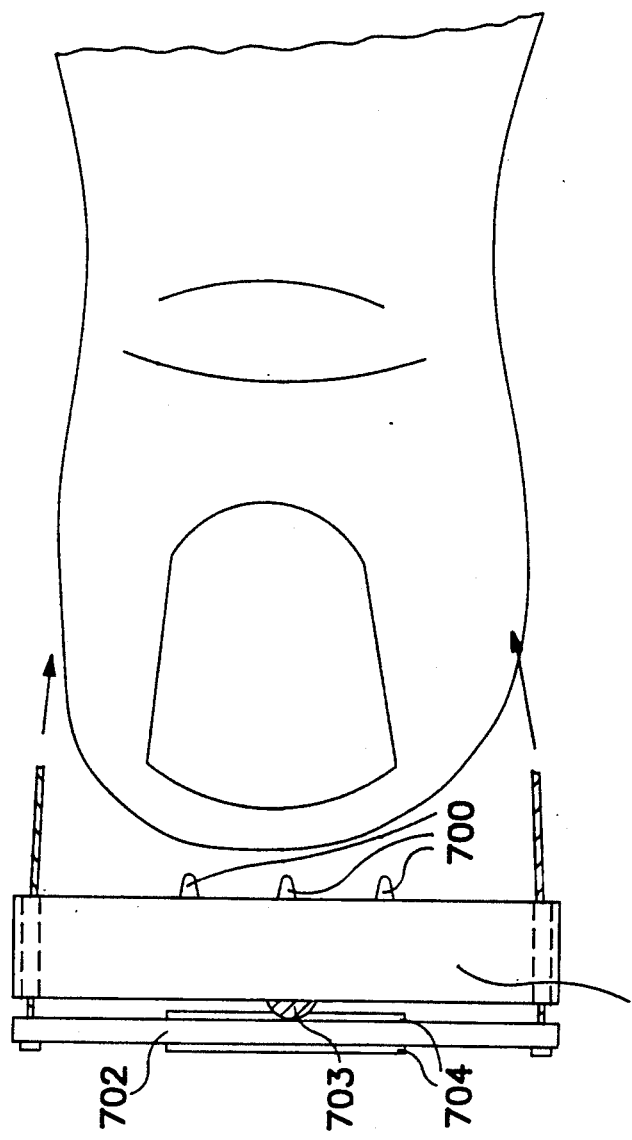

FIGS. 7a and 7b show an embodiment of a digit tip texture simulator. FIG. 7a shows the top view, while FIG. 7b shows a view looking at the the texture simulator from the digit tip. The particular embodiment shows a 3×3 texture array 700, where the texture elements are spaced on 3 mm centers and extend 1 mm when activated. Texture arrays employing various numbers of texture elements may be constructed. The texture array is contained within a modified force-applying platform 701 and held in juxtaposition to the digit tip by the supporting structure 519. As shown, this texture simulator assembly may also provide force feedback by including the same force-sensing platform 702, fulcrum 703, and strain gages 704 as described in FIGS. 5 and 6. In FIGS. 7a and 7b, the actuating mechanism for the texture elements is not shown.

Displacement is delivered to the digit tip texture simulator from the corresponding actuator as previously described in FIG. 3 via a tendon cable/casing or tubing assembly. FIG. 8a is a cross-section view where a tendon 800 enters the digit tip texture simulator 801, and when actuated, pulls on the base of a corresponding spring-loaded texture element 802 to raise it. When raised, the texture element extends from within its enclosure and presses against the digit tip. When the tendon force is reduced, the spring 803 causes the element to retract back into the digit tip texture simulating enclosure. In all of FIGS. 8a–8m, the diagram on the left shows the unactivated state and the right shows the activated state.

Figure 8B:
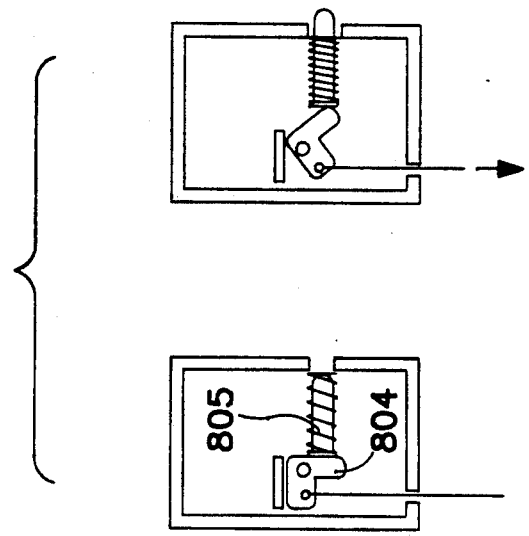
FIGS. 8a-8l show various tecture simulator embodiments.
Figure 8A:
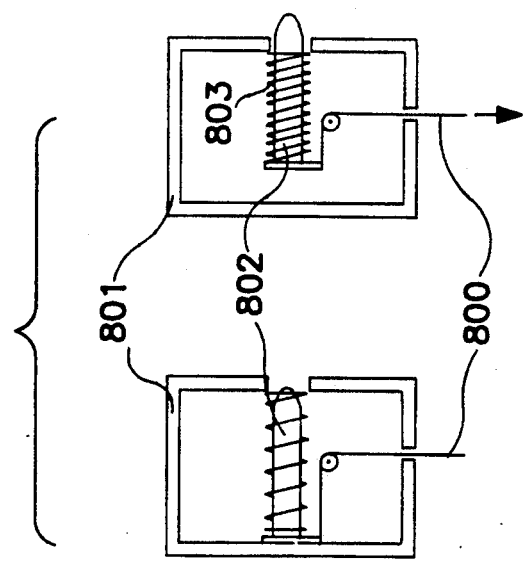

FIG. 8b is a cross-section view of a digit tip texture simulator where a tendon pulls on the L-shaped bracket 804, rotating it counter clockwise. As it rotates, the bracket pushes on the texture element which then extends from the digit tip texture simulator enclosure and presses against the digit tip. When tendon tension is removed, the spring 805 returns the texture element to its original, unextended position.

Figure 8D:
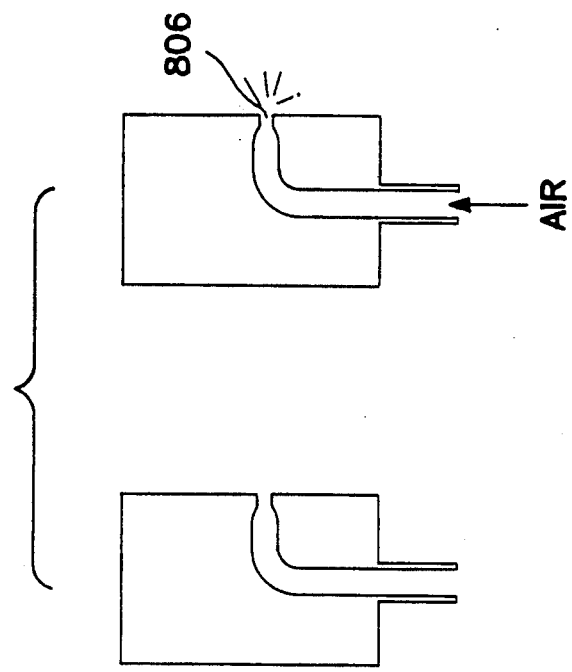
Figure 8C:
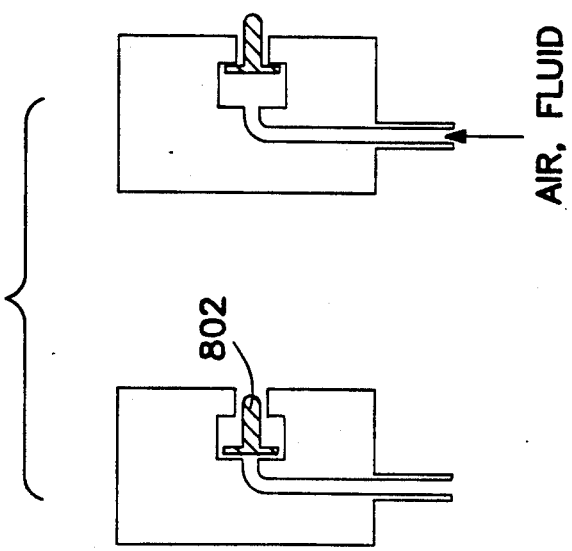

FIG. 8c is a cross-section view of a digit tip texture simulator when either pneumatics or hydraulics are employed. A positive pneumatic or hydraulic pressure extends the texture element and a negative pressure retracts it.

FIG. 8d is a cross-section view of a digit tip texture simulator where another type of pneumatic actuator is used. When actuated, air enters the device and exits through the nozzle 806. This focused air stream creates a tactile sensation on the digit tip.

Figure 8F:
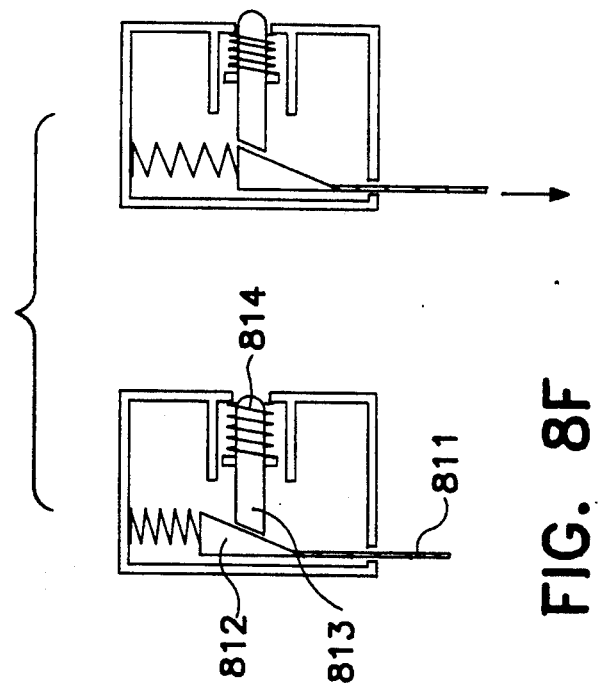
Figure 8E:
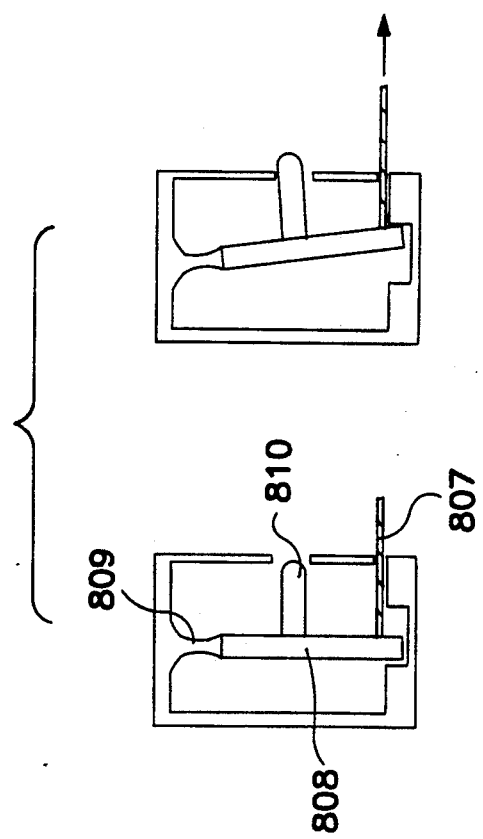

FIG. 8e is a cross-section view of a digit tip texture simulator where a tendon 807 pulls on the bar 808 causing it to pivot. The pivot may either be a hinge with a return spring or a living hinge 809 (as shown). A texture element 810 is attached to the bar which protrudes from the enclosure and presses against the digit tip when the bar pivots.

FIG. 8f is a cross-section view of a digit tip texture simulator where a tendon 811 pulls on a wedge 812 causing it to slide underneath and raise the texture element 813. When tendon force is released, the spring 814 returns the wedge to its initial position.

Figure 8H:
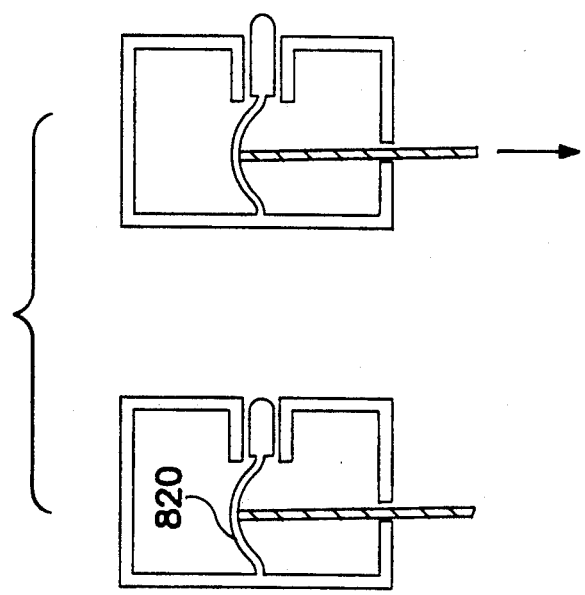
Figure 8G:
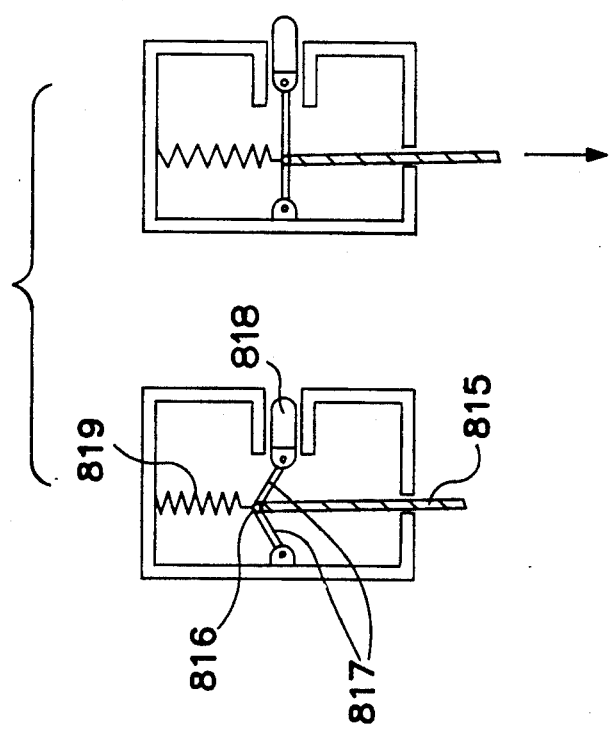

FIG. 8g is a cross-section view of a digit tip texture simulator where a tendon 815 pulls on the middle hinge 816 of the linkage 817, as shown, and raises the texture element 818. When tendon force is released, the spring 819 returns the hinge to its initial position.

FIG. 8h functions similarly FIG. 8g, but the hinges and spring are replaced by a flexible beam 820. The beam is initially curved, as shown. When a tendon force is applied, the beam straightens, forcing the texture element up.

Figure 8J:
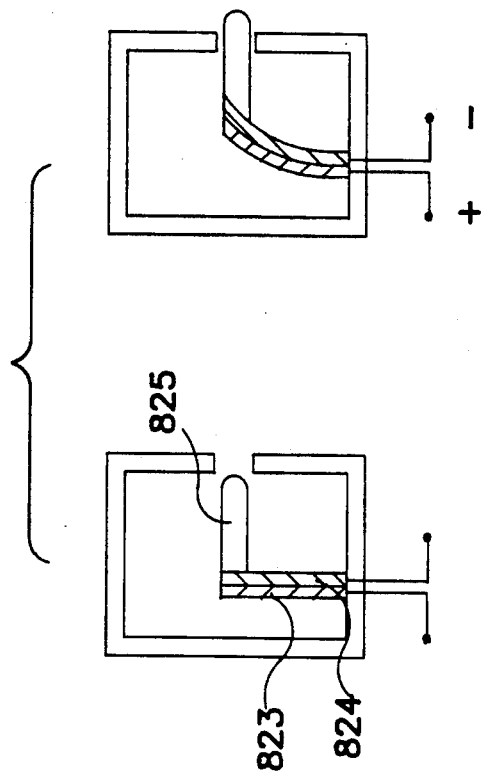
Figure 8I:
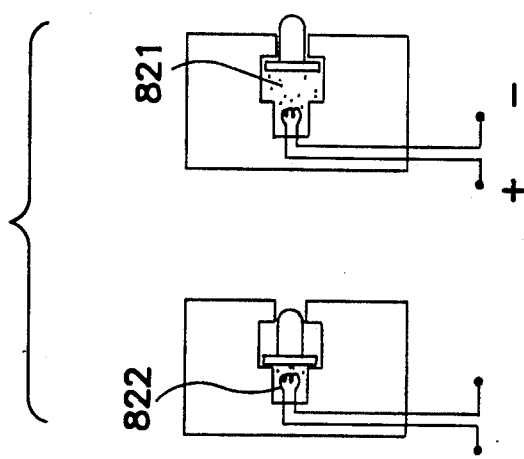

FIG. 8i is a cross-section view of a digit tip texture simulator where the texture element is raised by generating a pressure by heating either vapor, liquid or a combination of the two 821. Current is passed through the resistive heating coil 822, causing the vapor (or liquid) to heat up and expand and raise the texture element.

FIG. 8j is a cross-section view of a digit tip texture simulator where the texture element is raised by piezoelectric elements. A voltage applied to a piezoelectric element causes it to either expand or contract depending on the voltage polarity. In the figure, there are two separate pieces of piezoelectric material connected to form a "bimorph". The two element are wired with opposite polarities such that when a single voltage is applied, one piezoelectric element 823 expands while the other element 824 contracts. When one expands and the other contracts, the bimorph bends towards the direction of the element which contracts. A texture element 825 is attached to the free end of the bimorph and protrudes from the enclosure when the bimorph bends.

Figure 8L:
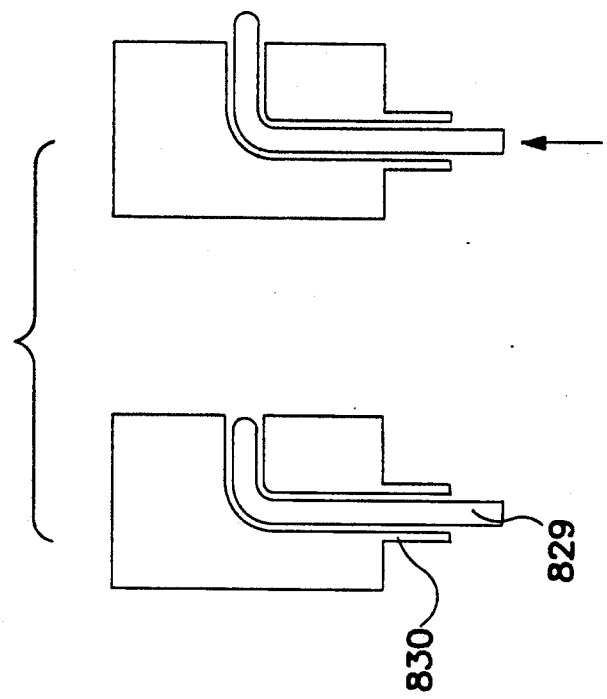
Figure 8K:
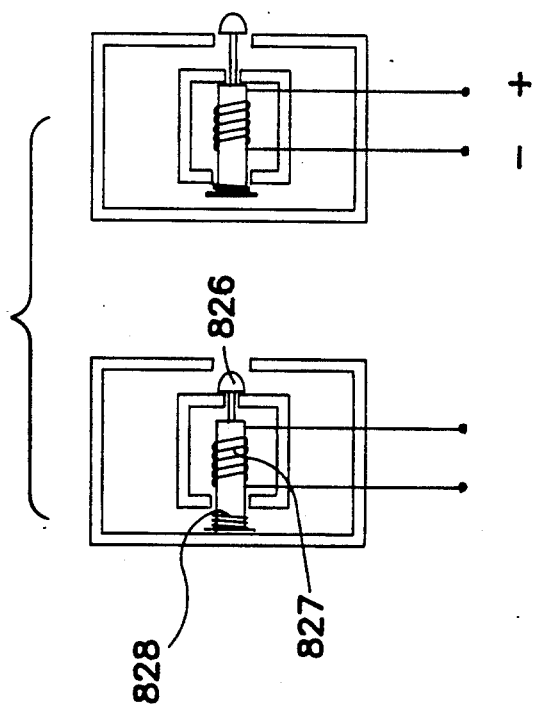

FIG. 8k is a cross-section view of a digit tip texture simulator where a texture element 826 acts as the plunger of a electromechanical solenoid. As current is applied to the coil 827, the texture element is raised. A spring 828 returns the texture element to its initial position when the current is removed.

FIG. 8l is a cross-section view of a digit tip texture simulator where a flexible, relatively incompressible fiber 829 (similar to a fiber optic wire) is used. The fiber resides in a flexible, but incompressible outer casing 830 (similar to the tendon/casing assembly). The fiber transfers displacement generated at one location (possibly by a bulky or heavy displacement actuator) to a second location (e.g., the digit tip) by sliding relative to the outer casing. The principle of operation is similar to a catheter tube. The end of the fiber is the actual texture element which protrudes and presses against the digit tip. The difference between this "fiber" method and the tendon method is that the tendon is "active" in tension while the fiber is "active" in compression.

In the embodiments shown in FIGS. 8i, k and l, the actuation displacement for the texture simulator is generated in the digit tip force applicator enclosure itself. Any of these same actuator technologies may be employed, but positioned at an alternate location (e.g., on the wristband or at the same place as the force actuator). The displacement may then be transferred to the digit tip by a tendon or pneumatic/hydraulic tube and used by any appropriate texture simulator.

In addition to the actuator technologies shown in FIGS. 8i, j and k, other, more standard force and displacement actuators such as electromechanical motors and pneumatic (hydraulic) compressors pumps) may be used. Shape memory alloys (SMA, e.g., Nickel/Titanium alloys) may also be used to generate the tensile force or displacement of a tendon. SMA wire has the property that is contracts when heated. The wire may be heated simply by passing an electrical current through it.

Figure 9:
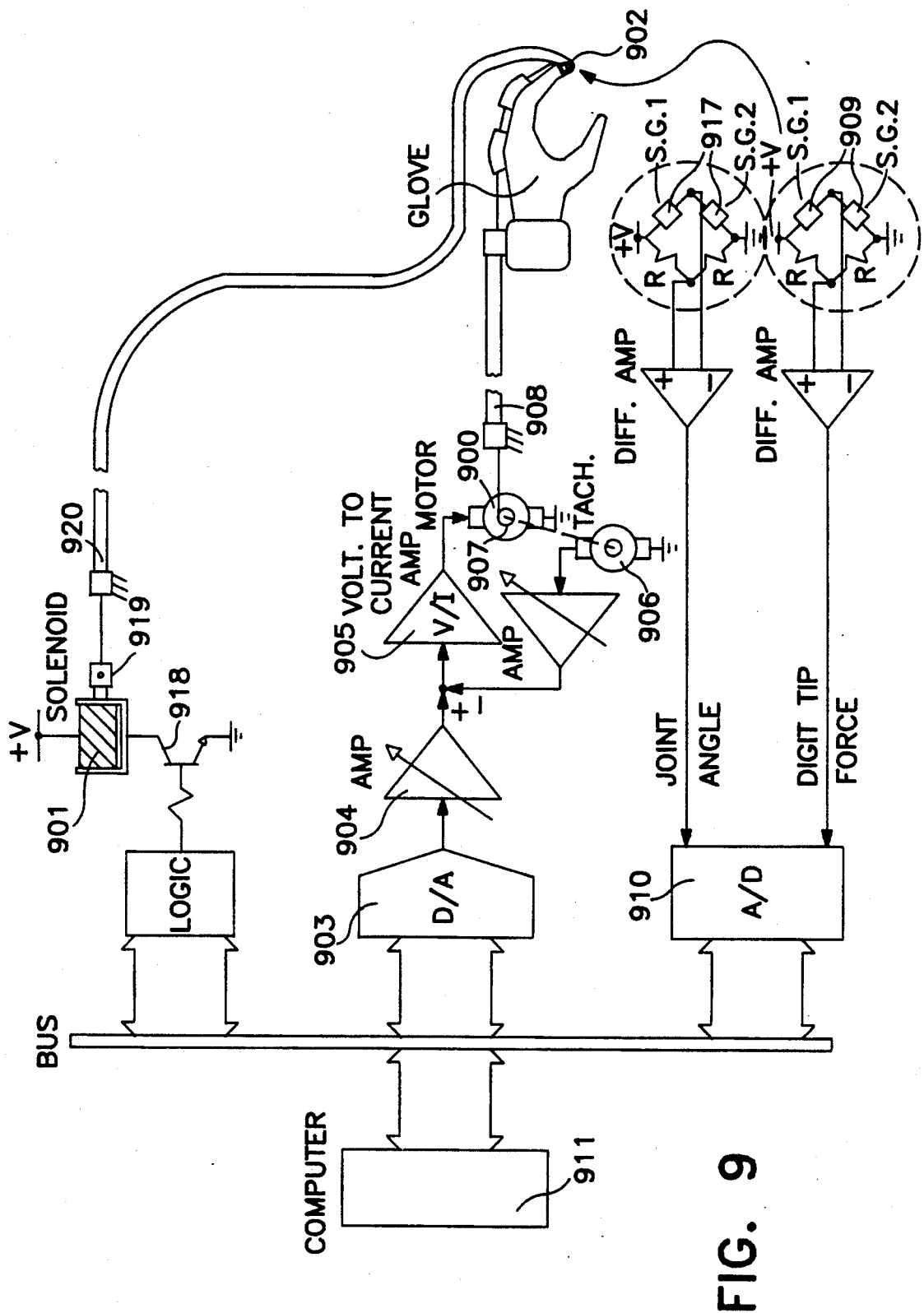
FIG. 9 is a schematic electrical-mechanical signal propagation diagram.
Figure 10:
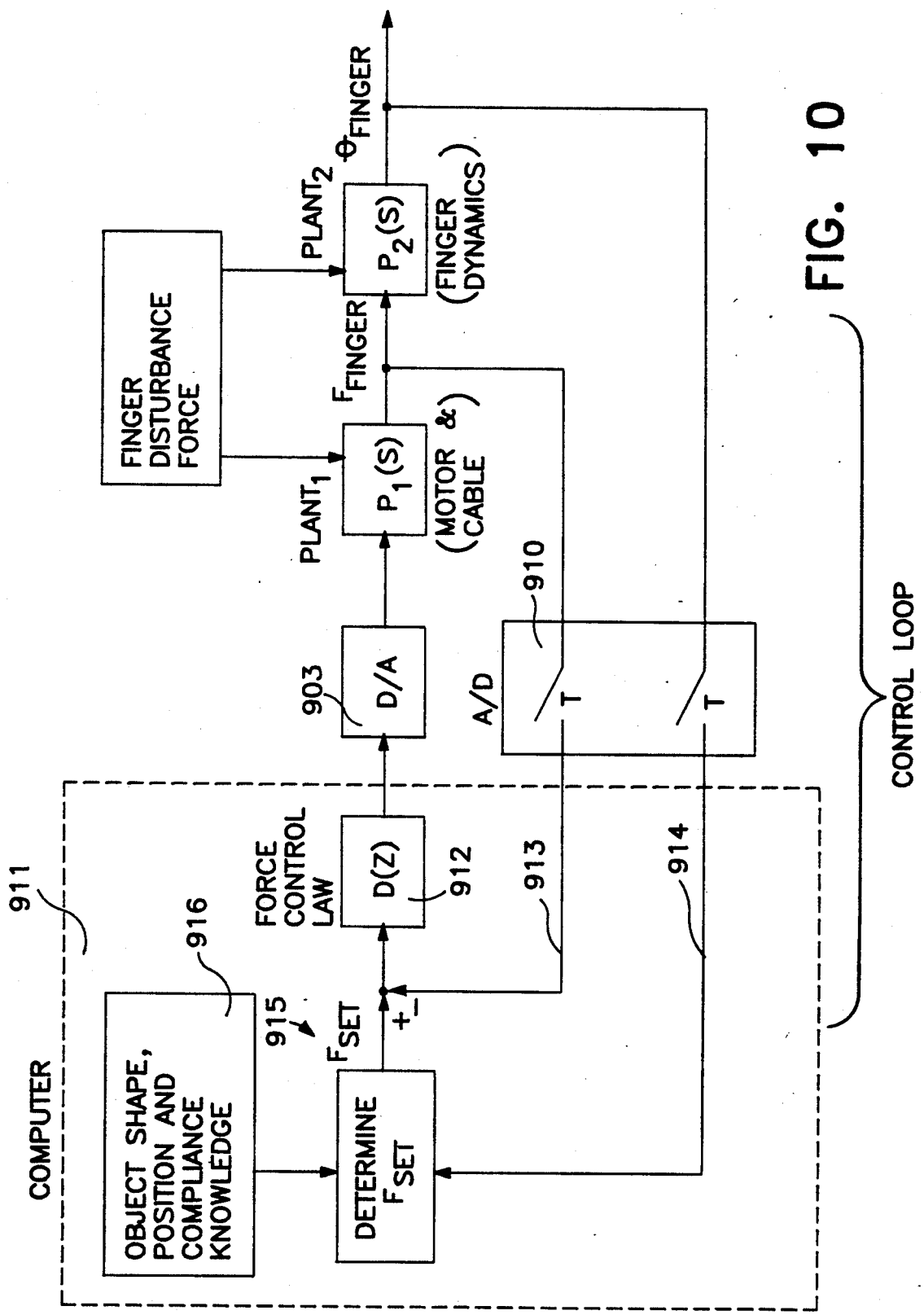
FIG. 10 is a control system block diagram for control of the digit tip force.

FIG. 9 shows how the electrical and mechanical signals propogate through the force/texture feedback control system. FIG. 10 is a diagram of the force and texture feedback control system in standard control theory block diagram form. The embodiment shown employs a d.c. servo motor 900 for force actuation and an electromechanical solenoid 901 to produce the displacement for a texture simulating element 902. A computer sends a digital value representing the desired force to the digital-to-analog converter (DAC) 903. The analog output of the DAC is then amplified by a variable gain amplifier 904. This amplified force set point voltage is then converted into a current by a common voltage-to-current configuration of a power operational amplifier 905. This current drives the servo motor at a desired torque. Velocity damping of the servo control loop is performed by tachometer feedback 906.

Torque generated by the motor is converted into a tensile force by a pulley 907 on the motor shaft. The diameter of this pulley is selected to achieve the desired force and speed of response for a given motor. In a preferred embodiment, a pulley diameter of $\frac{1}{4}$ inch was used. The generated tensile force is transmitted to the digit tip force applicator from the force actuator via a tendon cable/casing assembly 908. The force applied to the digit tip is sensed by the two strain gages 909 mounted differentially to the strain sensing platform and wired into a half-bridge configuration. A full Wheatstone bridge is used to amplify the detected force. This amplified signal is digitized by an analog-to-digital converter 910 and read into the computer 911.

The computer implements a force control law 912 (e.g., Proportional-Integral-Derivative) using well understood techniques from the field of digital control. The control law incorporates the feed back force information 913, and servos the motor to produce a desired force at the digit tip. Digitized values 914 from analog joint angle sensors provide the information the computer needs to determine the force set point 915. In a preferred embodiment, the computer converts digit joint angles into actual digit positions. If one of the digits is found to be intersecting a virtual object, the computer calculates the force to be applied to that digit using knowledge of the object's shape and compliance 916. In a preferred embodiment, differential strain gage angle sensors 917, as disclosed in the Kramer et. al. patent application, are used to determine joint angles.

As shown in FIG. 9, the computer also outputs commands to the displacement actuator of the texture simulating array. In the embodiment shown, the computer outputs digital values which control solenoid drive transistors 918. For example, a logical value of "1" turns the transistor "on," and a logical "0" turns the transistor "off." When the transistor is on, the solenoid coil is energized, and the plunger 919 is retracted. The retraction generates a displacement which is transmitted to the texture simulator 902 via a tendon cable/casing assembly 920. The texture simulator uses the displacement to extend the texture elements beyond the surface of the digit tip force-applicator platform against the digit tip. When the transistor is turned off, the solenoid plunger is extended by the return spring and cable tension is released. When the tension is released, the texture element is retracted back into the texture array platform housing by its own return mechanism.

By appropriately combining commands to the texture array and the force applicator, innumerous sensations may be applied to the digit tip. For example, by extending three texture elements along a single column and then actuating the force platform to press against the digit tip, the sensation of touching the digit tip to the vertical edge of an object is simulated. If the three extended texture elements of the column are retracted at the same time that the three elements of the adjacent column are raised, a sensation that the object edge is moving across the digit tip will be produced. This sensation may be used either when an object edge is moving and the digit tip is remaining stationary, or when the object position is fixed and the digit tip is moving across the edge. With appropriate modifications, force and texture may be simulated at other parts of the body besides the digit tip, such as is shown or the arm in FIG. 2c.

While the invention has been described with reference to specific embodiments, the description is illustrative of the invention and is not to be construed as limiting the invention. Thus, various modifications and amplifications may occur to those skilled in the art without departing form the true spirit and scope of the invention as defined by the appended claims.

What is claimed is:

1. A device for producing a signal at a sensing body part simulating the interaction between an interactive entity and a virtual or physical object, said device comprising:
    means for generating a force simulating the interaction between said interactive entity and said object; and
    at least one of:
    (a) means for applying said generated force between said sensing body part and a second body part which serves as a non-sensing part;
    (b) means for applying said generated force to said sensing body part, said applying means comprising an entity displaced from said sensing body part in a first unactivated position and touching said sensing body part in a second activated position; and
    (c) means for applying said generated force to produce a displacement of one or a plurality of texture elements, each element comprising an extendable and retractable pin or a focused fluid stream; and
    (d) means for applying said generated force to a sensing body part by means of at least one elongated element guided by a housing along the surface of the body across a joint, which joint is to be affected as a result of said generated force applied to said element.

2. A device according to claim 1, further comprising:
    means for sensing position of a controlling body part and producing a signal related to said position of said controlling body part; and
    signal collection and producing means for receiving said signal, controlling the interaction between said interactive entity and said object in relation to said signal and actuating said generating means to produce said force in relation to the interaction of said interactive entity and said object.

3. A device according to claim 1, said force generating means comprising:
    force actuating means;
    transmitting means for transmitting force from said actuating means to at least one of said applying means, said transmitting means comprising:
    at least one flexible elongated element; and
    a housing for guiding said element.

4. A device according to claim 1, wherein said applying means between said sensing body part and second body part comprises:
at least one flexible elongated element, said element comprising a tendon or a fluid; and
housing for guiding said element.

5. A device according to claim 1, wherein said sensing body part is a digit.

6. A device according to claim 5, wherein said device further comprises a glove support structure supporting said applying means.

7. A device according to claim 1, wherein said force generating means is a motor or solenoid.

8. A device for producing a signal at a sensing body part simulating the interaction between an interactive entity and a virtual or physical object according to claim 1, said device further comprising:
means for generating a force simulating the interaction between said interactive entity and said object; and
means for applying said generated force to said sensing body part, said applying means comprising a force sensing element in proximity, to said sensing body part.

9. A device for producing a signal at a sensing body part simulating the interaction between an interactive entity and a virtual or physical object, said device comprising:
means for generating a force simulating the interaction between said interactive entity and said object; and
means for applying said generated force between said sensing body part and a second body part which serves as a non-sensing part.

10. A device according to claim 9, wherein said sensing body part is a digit and said non-sensing part is a wrist.

11. A device for producing a signal at a sensing body part simulating the interaction between an interactive entity and a virtual or physical object, said device comprising:
means for generating a force simulating the interaction between said interactive entity and said object; and
means for applying said generated force to said sensing body part, said applying means comprising an entity displaced from said sensing body part in a first unactivated position and touching said sensing body part in a second activated position.

12. A device according to claim 11, said entity comprising a force-applying platform;
a supporting structure for holding said force-applying platform in juxtaposition to said sensing body part; and
retractable means for holding said force-applying platform in said first position.

13. A device according to claim 11, wherein said sensing body part is a digit tip.

14. A device for producing a signal at a sensing body part simulating the interaction between an interactive entity and a virtual or physical object, said device comprising:
means for generating a force simulating the interaction between said interactive entity and said object; and
means for applying said generated force to said sensing body part, said applying means, comprising a force-sensing element in proximity to said sensing body part;
wherein said element comprises:
a force-sensing platform;
a force-applying platform;
a fulcrum mounted on said force-applying platform and supporting said force-sensing platform; and
mechanical means connecting said force-sensing platform to said force generating means, wherein actuation of said force-sensing platform by said generated force moves said force-applying platform into contact with said sensing body part.

15. A device for producing a signal at a sensing body part simulating the interaction between an interactive entity and a virtual or physical object, said device comprising:
means for generating a force simulating the interaction between said interactive entity and said object;
means for applying said generated force to produce a displacement of one or a plurality of texture elements, each element comprising an extendable and retractable pin or a focused fluid stream; and
means for holding said texture elements in juxtaposition to said sensing body part.

16. A device according to claim 15, wherein said sensing body part is a digit tip.

17. A device according to claim 15, wherein said texture element(s) is a 3×3 array of texture elements.

18. A device for producing a signal at a sensing body part simulating the interaction between an interactive entity and a virtual or physical object, said device comprising:
means for generating a force simulating the interaction between said interactive entity and said object, comprising first and second force generating means;
means for applying said first generated force to said sensing body part, said applying means comprising an entity displaced from said sensing body part in a first unactivated position and touching said sensing body part in a second activated position; and
means for applying said second generated force to produce a displacement of one or a plurality of texture elements, each element comprising an extendable and retractable pin or a focused fluid stream.

19. A device according to claim 18, further comprising means for applying said first generated force to a force sensing body part, said applying means comprising a force-sensing element in proximity to said sensing body part.

20. A device according to claim 18, wherein said sensing body part is a digit tip.

21. A device according to claim 18, further comprising;
means for sensing position of a controlling body part and producing a signal related to said position of said controlling body part.

22. A device according to claim 21, further comprising:
signal collection and producing means for receiving said signal, controlling the interaction between said interactive entity and said object in relation to said signal and actuating said generating means to produce said force in relation to the interaction of said interactive entity and said object.

23. A device according to claim 18,
wherein said applying means for said first generated force comprises:
transmitting means comprising:

at least one flexible elongated element, said element comprising a tendon or a fluid; and a housing for guiding said element.

24. A device for producing a signal at a sensing body part simulating the interaction between an interactive entity and a virtual or physical object, said device comprising:

means for generating a force simulating the interaction between said interactive entity and said object; and means for applying said generated force to a sensing body part by means of at least one elongated element guided by a housing along the surface of the body across a joint, which joint is to be affected as a result of said generated force applied to said element.

* * * * *